US006584216B1

(12) United States Patent
Nyúl et al.

(10) Patent No.: US 6,584,216 B1
(45) Date of Patent: Jun. 24, 2003

(54) METHOD FOR STANDARDIZING THE MR IMAGE INTENSITY SCALE

(75) Inventors: László G. Nyúl, Papkeszi (HU); Jayaram K. Udupa, Audobon, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 0 days.

(21) Appl. No.: 09/447,781

(22) Filed: Nov. 23, 1999

(51) Int. Cl.$^7$ ................................................ G06K 9/00
(52) U.S. Cl. ...................... 382/131; 600/407; 250/474.1
(58) Field of Search ................. 382/131, 128, 382/168; 250/474.1; 600/407; 128/922; 378/21

(56) References Cited

U.S. PATENT DOCUMENTS

| | | | | |
|---|---|---|---|---|
| 5,150,421 A | * | 9/1992 | Morishita et al. | 382/128 |
| 5,262,945 A | * | 11/1993 | DeCarli et al. | 600/410 |
| 5,410,250 A | * | 4/1995 | Brown | 324/309 |
| 5,675,624 A | * | 10/1997 | Relihan et al. | 378/97 |
| 5,727,080 A | * | 3/1998 | Cox et al. | 382/168 |
| 5,742,163 A | * | 4/1998 | Liu et al. | 324/307 |
| 6,121,775 A | * | 9/2000 | Pearlman | 324/300 |
| 6,373,250 B1 | * | 4/2002 | Tsoref et al. | 324/307 |
| 6,430,430 B1 | * | 8/2002 | Gosche | 600/410 |

OTHER PUBLICATIONS

Bezdek et al., "Review of MR image segmentation techniques using pattern recognition", *Med. Phys.* 20 (4): 1033–1048 (1993).
Clarke et al., "MRI: Stability of Three Supervised Segmentation Techniques", *Magn. Reson. Imaging*, 11(1):95–106 (1993).
Edelstein et al., "A signal–to–noise calibration procedure for NMR imaging systems", *Med. Phys.* 11(2):180–180 (1984).
Kikinis et al., "Routine Quantitative Analysis of Brain and Cerebrospinal Fluid spaces with MR Imaging", *J. Magn. Reson. Imaging*, 2:619–629 (1992).
Udupa et al., "*Multiple Sclerosis Lesion Quantification Using Fuzzy–Connectedness Principles*", *IEEE Trans. Med. Imaging*, 16(5):598–609.
Wendt, "Automatic Adjustment of Contrast and Brightness of Magnetic Resonance Images", *J. Digit. Imaging* 7:95–97 (1994).
Yamanoto et al., "*Accurate and Practical Calibration of MR Signal Intensities by the New Transmission Amplitude Method: application of the Numberical Diagnosis to MRI*", *Radiology* 209(P):532(1998)).

* cited by examiner

Primary Examiner—Jayanti K. Patel
Assistant Examiner—Barry Choobin
(74) Attorney, Agent, or Firm—Dilworth Paxson LLP; Evelyn H. McConathy

(57) ABSTRACT

The present invention provides a method for standardizing MR image intensity scales by the use of post-processing intensity transformation techniques applied to routinely acquired images. The method requires neither specialized acquisition protocols, nor calibration phantoms. The standardizing method offers previously unattainable consistency of intensity meaning of tissues by devising a transformation that is specific to a given MRI protocol and/or for any body region to provide standardized images. Essentially, the histogram of a given volume image is deformed to match a "standard" histogram for the corresponding MRI protocol and body-region, thereby minimizing or eliminating the human interaction required in the per-case manual window adjustments needed to visualize MR images at physician viewing stations. The method offers significantly more consistent tissue meaning for MR image intensities than the images before standardization. Also provided are MR images having standardized intensity scales.

17 Claims, 16 Drawing Sheets

METHOD FOR STANDARDIZING THE MR IMAGE INTENSITY SCALE

GOVERNMENT INTEREST

This work was supported in part by at least one grant from NIH, number NS 37172. The government may have certain rights in this invention.

FIELD OF THE INVENTION

This invention relates to magnetic resonance imaging (MRI), image normalization, image display, and image processing.

BACKGROUND OF THE INVENTION

Magnetic Resonance Imaging (MRI) has revolutionized radiological imaging of the internal structures of the human body. It has the advantage of being noninvasive with no known health hazards. A variety of MRI protocols are currently available, with and without the use of contrast agents, such as T1, T1 with a contrast agent, T2 and proton density (Pd) with spin-echo (SE) or fast spin-echo (FSE) sequences, magnetization transfer (MT), FLAIR, SPGR, and GRASS. These protocols allow a variety of contrasts to be set up among the different tissues within the same organ system.

Ironically, this richness of image acquisition modalities presents a major problem. The image intensities in MRI do not have a fixed meaning, not even within the same protocol for the same body region obtained on the same scanner for the same patient. This is due to a variety of scanner-dependent variations. Unlike other imaging methods, such as x-ray computerized tomography, MR images lack a standard and quantifiable interpretation of image intensities. Consequently, absolute intensity values lack a fixed meaning. This implies that MR images cannot be displayed at preset windows. One may have to re-adjust the window settings for each case, perhaps even for the same patient. The lack of a meaning for intensities also poses problems in image segmentation and quantification (Bezdek et al., *Med Phys.* 20 (4):1033–1048 (1993); Clarke et al., *Magn. Reson. Imaging*, 11 (1):95–106 (1993); Kikinis et al., *J. Magn. Reson. Imaging*, 2:619–629 (1992); Udupa et al., *IEEE Trans. Med Imaging*, 16(5):598–609 (1997)).

Most visualization and analysis methods have parameters. The exceptions are perhaps manual methods, wherein the human knowledge can be considered to be representative of the parameters. However, the results of segmentation by two physicians are likely to differ because of the differences in their training. Setting values for the parameters for the non-manual methods becomes more difficult without the same protocol-specific intensity meaning. Thus, there has been a recognized need in the art, with regard to protocols that were the same or "close" to each other, to try to develop ways that the resulting images would also be "close."

Attempts have been made in the past to calibrate MR signal characteristics at the time of acquisition using phantoms (Edelstein et al., *Med. Phys.* 11 (2):180–185 (1984); Yamamoto et al., *Radiology* 209(P):582 (1998)). Although it is feasible to do such a calibration of each patient scan, it would obviously be too cumbersome to be practical or efficient. Moreover, such a technique is not applicable to image data that have already been acquired without the required calibration phantoms. Post-processing techniques that could be applied to the image data without special acquisition requirements would clearly be more practical and attractive to the practitioner. Such methods would not only make acquiring images simpler, but also permit processing already-acquired data.

There has been a natural tendency to think that a simple scaling of the minimum to maximum intensity range of the given image to a fixed standard range could solve this problem. However, as illustrated in FIG. 1, simple scaling is usually ineffective in achieving a similarity of intensities.

A post-processing technique to automatically adjust the contrast and brightness of MR images (i.e., "windowing") for image display has been presented in Wendt, *J. Digit. Imaging* 7:95–97 (1994). However, although such automatic windowing may achieve display uniformity, it is inadequate for quantitative image analysis, since the intensities still do not have tissue-specific meaning after the windowing transformation. There does not seem to have been any serious attempt to address this latter problem in the past.

Therefore, although the need for image consistency was recognized, solutions to the problem were not forthcoming until the present invention. Until now, there remained a need for a simple, quick and reliable means and method by which MR images could be transformed under conditions by which there is a significant gain in the similarity and the meaning of intensities of the resulting images.

SUMMARY OF THE INVENTION

The present invention provides a method for standardizing MR image intensity scales by post-processing intensity transformation techniques on routinely acquired images, without requiring specialized acquisition protocols and calibration phantoms. The standardizing method offers previously unattainable consistency of intensity meaning of tissues by devising a transformation that is specific to a given MRI protocol, $P \in \mathcal{P}$, and for any body region, $D \in \mathcal{D}$, to provide standardized images, $V_{si}$. Essentially, the histogram of a given volume image is deformed to match a "standard" histogram for the corresponding protocol and body-region. The parameters of the standard histogram are "learnt" in a training step. This permits standardizing and fixing "windows" by protocol, body region, and tissue regions, thereby minimizing or eliminating the human interaction required in the per-case manual window adjustments that are currently required in visualizing MR images at physician viewing stations. The method offers significantly more consistent tissue meaning for MR image intensities than the images, $V_i$, before standardization.

Accordingly, it is an object of the invention to provide a method for standardizing MR image intensity scales for imaging a region of the body of a patient, wherein the method comprises post-processing intensity transforming a routinely acquired MR image of the region of the patient's body, wherein the image is acquired by any selected MRI protocol, and wherein the method requires no specialized acquisition protocol or calibration phantoms.

It is a further object of the invention to provide a method for standardizing MR image intensity scales, wherein a standardized intensity histogram is achieved for the selected MRI protocol, and for the selected region of the patient's body, by the steps comprising: a) estimating for the selected protocol and region of the patient's body, certain landmarks from a given set of image histograms to form a standard histogram, a standardizer; (b) imaging the region of the patient's body by the selected protocol to form an image histogram, and (c) computing the standardized intensity histogram by mapping landmarks determined from the image histogram to corresponding landmarks of the standard scale histogram.

Preferred embodiments of the invention are provided, wherein the standardized images of similar intensities have similar tissue meaning, independent of variations within or between patients. The standardization is specific to a MRI protocol and/or to a specific body region. The resulting standarized images are independent of variations within or between MRI scanners.

Theoretical guidelines are provided, accompanied by a practical demonstration of how to utilize them for selecting the values of the parameters of the method. In addition, the present invention offers proofs that lossless intensity transformation and order is guaranteed if choices are made in accordance with the provided guidelines. Several variants of the method are provided, which utilize different, representative scale parameters and landmarks. Because median and other percentile values are more robust than the mode, using the landmarks of the present invention results in a more robust standardizer. "Mode" refers to the image intensity, which occurs most frequently within the body region in the acquired image. Consequently, more consistent meaning of intensities and better-defined ranges for different tissues on the standard scale are possible by the present methods than were previously possible, permitting a practitioner to set better intensity of interest ranges, while retaining the ability to distinguish relevant information at the ends of the scale.

In a preferred embodiment of the invention, the method is automated.

It is an object of the invention to provide a method, whereby standardization of the image permits using predetermined display window settings and facilitates image segmentation. Image analysis and tissue segmentation methods are considerably improved, in terms of constancy of parameter settings and degree of automation upon scale standardization. In accordance with the standardization provided by the present invention, numerical meaning is achieved, offering the capability of making numerical diagnoses and advanced understanding of diseases. The preferred methods are, therefore, a recommended first step in every MR image visualization and analysis task.

In additional preferred embodiments of the invention, a standardizer $\tau_{Vi}$ is stored in a lookup table and/or the standardized image $V_{si}$ is stored as output image intensity in a lookup table.

In accordance with a preferred embodiment, the MR images are accompanied by the standardizer lookup table when downloaded to the viewing station. In another preferred embodiment, the images are automatically standardized. In yet another preferred embodiment, standardization is built into a MR scanner, permitting production of real time images with the standard scale.

It is a further object of the invention to provide standardized MR image intensity scales for imaging a region of the body of a patient.

It is also an object of the invention to provide a standardized MR image. In preferred embodiments, the standardized MR image is provided by the methods for standardizing MR image intensity scales of the invention for imaging a region of the body of a patient. In additional preferred embodiments the image is provided by a post-processing step, wherein a routinely acquired MR image of the region of the patient's body is intensity transformed. In yet another preferred embodiment, the image is acquired by any selected MRI protocol and/or for any region of the patient's. Moreover, the image is provided by a method, which requires no specialized acquisition protocol or calibration phantoms.

It is also an object to provide a standardized MR image of a region of the body of a patient by the automated methods of the invention.

The invention will be more fully understood from the following detailed description of preferred embodiments, drawings and examples, all of which are intended to be for illustrative purposes only, and not intended in any way to limit the invention.

BRIEF DESCRIPTION OF THE FIGURES

In FIG. 1(a) the images were obtained using the same Pd protocol on the same scanner and their histograms. FIG. 1(b) depicts the same images after scaling to a fixed range, and their corresponding histograms. The window level for display is set at the mid-point of the full range and the window width is the full range.

FIG. 2(a) depicts the bimodal histogram, wherein the second mode of the histogram is $\mu$. FIG. 2(b) depicts the unimodal histogram, wherein the shoulder of the "background hump" is $\omega$.

FIG. 4(a) shows 3 landmarks (for configuration $L_1$), and FIG. 4(b) shows the general case with l landmarks.

FIG. 11(a) depicts the images before standardization. FIG. 11(b) depicts the images after standardization as determined by method 2 (see Table 1).

FIG. 12(a) images are a FSE Pd study. FIG. 12(b) images were obtained using a T2 contrast agent.

FIG. 13(a) depicts the images before standardization displayed at a default window. FIG. 13(b) depicts the images after standardization displayed at a standard window using method 2 (see Table 1). The training data were acquired using a protocol similar to the SE Pd protocol with slightly different parameters from a scanner of the same brand at a different hospital.

FIG. 15(a) depicts the images displayed at default windows. FIG. 15(b) depicts the same slices, displayed at a fixed "standard" window after standardization using method 2 with the parameters that were derived from a training set of an identical SE Pd protocol. FIG. 15(c) depicts the images, displayed after standardization using the same method with the parameters that were derived from a training set of images acquired using a FSE Pd protocol displayed at the "standard" window for FSE Pd.

FIG. 16(a) shows the display at a study-specific default window of one slice of a study from each of the cited protocols before standardization. FIG. 16(b) shows the same slices after standardization (using method 2) displayed at one fixed window.

DETAILED DESCRIPTION OF THE INVENTION

Figure 1:
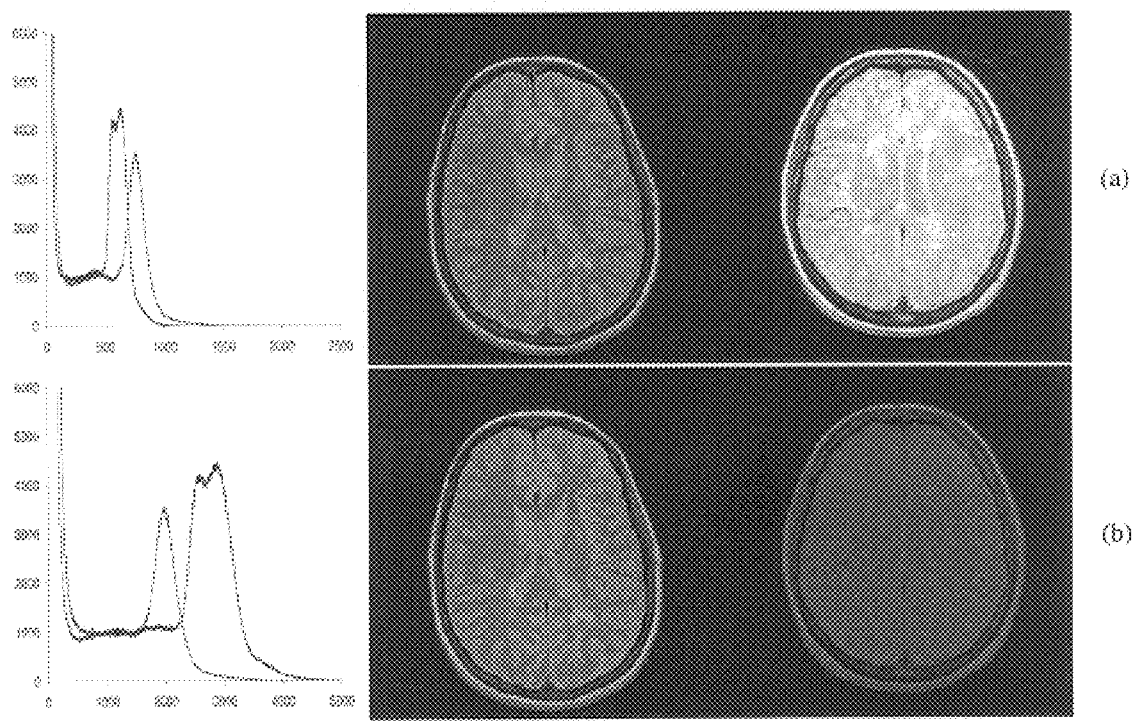
FIG. 1 depicts a pair of brain images.

This invention provides a simple way of transforming MR images so that there is a significant gain in the similarity and meaning of intensities of the resulting images. It is based on transforming the intensity histogram of each given image into a "standard" histogram. This is achieved in two steps. First, there is a training step, which is executed only once for a given protocol and body region. Second, there is a transformation step, which is executed for each given image.

By "protocol" is meant any particular pulse sequence used in MR imaging.

By "body region" is meant a particular three-dimensional region of the human body, such as the head, the foot, hand, the knee, the pelvic region, chest, thorax, etc., that is scanned for acquiring the MR images.

"Transformation" refers to a mathematical mapping of the range of image intensities in the input image to the range of intensities in the output image on the standard scale.

"Training" refers to the process of estimating the parameters necessary to determine the transformation for a particular protocol and body region. It is necessary to tailor the transformation to each protocol and body region. In the training step, certain landmarks of a standard histogram (for the body region and protocol under consideration) are estimated from a given set of images. A "landmark," as used in the histogram of the present invention, refers to the location of a histogram-specific parameter. In the transformation, standard scale is computed by mapping the landmarks determined from the histogram of the given image to those of the standard histogram. "Intensity transformation" means the same as, and is used interchangeably with "transformation." The "intensity scale" of an image refers to the range of intensity values in the image. The "input image" is a given image whose intensities need to be standardized. The "standard scale" is the intensity scale of the standardized image. The transformation results in a standardized scale for each protocol and body region. Intensities in the transformed images have consistent tissue meanings, and standard window settings can be determined for different tissues, just as they are in computerized tomography (CT).

A preferred two-step method is provided, wherein all images (independent of patient characteristics or variations between specific brands of MR scanner being used) can be transformed, such that for the same protocol and body region, transformed images of similar intensities will have similar tissue meaning.

Briefly stated, in the first step, the parameters of the standardizing transformation are "learnt" from an image set. In the second step, for each MR study, these parameters are utilized to determine the mapping needed to deform the resulting histogram into a standardized histogram. The method has been tested quantitatively on 90 whole brain studies of Multiple Sclerosis patients for several protocols, and qualitatively for several other protocols and body regions. As measured by mean squared difference and the coefficient of variation of the mean tissue intensities, standardized images have statistically significantly more consistent range and intensity meaning for tissues than those without. This consistency was achieved independently of the scanners.

Fixed gray level windows are established for the standardized images and used for display without the need of per case adjustment. Thus, in accordance with the present method, image analysis and tissue segmentation methods were considerably improved in terms of their constancy of parameter settings and their degree of automation.

The method is simple, fast, easy to implement, and completely automatic. For example, in a Picture Archiving and Communication System (PACS), the present method can be incorporated as a DICOM Value of Interest "lookup table" in the image header. "DICOM" is an acronym for Digital Imaging and Communications in Medicine and refers to a standard that is commonly accepted by the medical imaging community for exchange and communication of images in a standard format. A "lookup table" refers to a method of storing an intensity transformation. It is a one-dimensional array of values, wherein the number of cells in the array indicates the input image intensity, and the stored value represents the output image intensity.

The transformed images permit predetermined display window settings and also facilitate image segmentation. The images can be automatically transformed or accompanied by the correct "lookup table" when they are downloaded to the viewing station. The method can even be built into the MR scanner, to automatically produce real time images with the standard scale.

1. The Standardizing Method

The framework of the standardizing method, as disclosed below, is set forth in a general way so that many variants can be deduced from the same framework by one of ordinary skill in the art. The "standardizing method" refers to the procedures and algorithms involved in converting an input image into a standardized image. The transformation depends on the values of certain key variables such as $pc_1$, $pc_2$, and the histogram landmarks. These are referred to as the parameters of the method. Guidelines are provided below on the selection of landmarks so that there is no information loss during standardization.

1.1 Notation

"MRI protocols" are denoted by $\mathcal{P}=\{P_1, P_2, \ldots, P_n\}$, and the "set of body regions" by $\mathcal{D}=\{D_1, D_2, \ldots, D_m\}$. The "volume image" (or simply "image") refers to the set of cross-sectional images of a particular body region. It may be the original image or the standardized image. Volume image is represented by a pair $\mathcal{V}=(V, g)$, where V is a 3-dimensional array of volume elements ("voxels") covering a body region of the particular patient for whom image data $\mathcal{V}$ are acquired; and g is a function, called "intensity function," that assigns an integer "intensity value" for each $v \in V$. It is assumed that $g(v)>0$ for all $v \in V$, and $g(v)=0$ if, and only if, there are no measured (and computed) data for voxel v. The set of all images that can possibly be generated per protocol $P \in \mathcal{P}$ for body region $D \in \mathcal{D}$ is denoted by $\mathcal{V}_{PD}$.

"Intensity function" represents the assignment of a value to each voxel. The set of voxels constitutes a discretization of the body region into small voxels, each of which is cuboid. The intensity value assigned to each voxel represents an aggregate property of the tissue in the voxel measured by the MR scanner.

The "histogram," $\mathcal{H}$ of any image $\mathcal{V}$ is a pair $\mathcal{H}=(G, h)$, where G is the set of all possible intensity values in $\mathcal{V}$ (i.e., the range of g), and h is a function whose domain is G and whose value for each $x \in G$ is the number of voxels $v \in V$ for which $g(v)=x$. Let $m_1=\min\{g(v)|\in V$ and $g(v)>0\}$ and $m_2=\max\{g(v)|v \in V$ and $g(v)>0\}$, the minimum and maximum intensity values in $\mathcal{V}$, respectively.

1.2 Landmarks on the Histogram

It is desirable to cut off the tails of the histogram of the image because they often cause problems. Usually the high intensity tail corresponds to artifacts and other intensities, and causes considerable inter- and intra-patient/scanner variations. With this in mind, the following assumptions are made. Let $pc_1$ and $pc_2$ denote the minimum and maximum percentile values, respectively, that are used to select a range of intensity of interest (IOI). Let the actual intensity values, corresponding to $pc_1$ and $pc_2$ in the histogram, be $p_1$ and $p_1$. The percentiles $pc_1$ and $pc_2$ are a number between 0 and 100 which represent the percent of the total number of voxels in the image. By comparison, $p_1$ and $p_2$ represent the intensity values, such that the number of voxels with an intensity value less than or equal to these values are $pc_1$ and $pc_2$ percent of the total number of voxels in the image. Thus, the following relationship is provided:

$$100 \cdot \sum_{x=m_1}^{p_1} h(x) = pc_i \cdot \sum_{x=m_1}^{m_2} h(x) \quad (i=1,2) \quad \text{(Equation 1)}$$

The determination of $pc_1$ and $pc_2$ will be discussed in a subsequent section.

Figure 2:
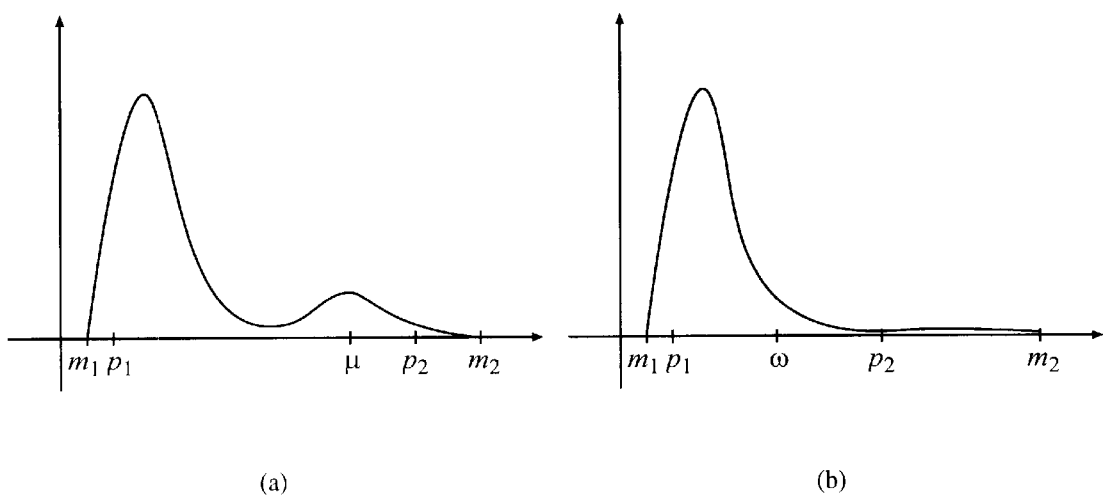
FIG. 2 schematically depicts the location of the histogram-specific parameters (landmarks). Minimum intensity in the image is $m_1$; maximum intensity in the image is $m_2$. Minimum percentile intensity is $p_1$; maximum percentile intensity is $p_2$.

Based on an examination of over 20 body region/protocol combinations, the inventors have identified that there are primarily two types of histograms among MR images: unimodal and bimodal (see FIG. 2). In the "unimodal" image the histogram has a single mode or peak, whereas in the "bimodal" image the histogram has two peaks.

In a bimodal histogram, the second mode ($\mu$), corresponding to the main foreground object in the image, can be used as a histogram landmark. By "mode" is meant the intensity value at which a peak occurs in the histogram. By "histogram landmark" is meant the location of a histogram-specific parameter.

In a unimodal histogram the mode usually corresponds to the background intensity value, so another landmark must be selected. This may be, for example, the shoulder ($\omega$) of the hump of the background intensity values. The locations of the histogram-specific parameters in these two cases are schematically illustrated in FIG. 2.

The methods of the present invention are applicable to produce histograms from either unimodal or bimodal applications, as well as from other (multimodal) cases. By "multimodal" is meant a histogram with more than two predominant peaks. A preferred embodiment of the invention is the bimodal application, as exemplified. However, the application need not be in any way limited since one of ordinary skill in the art could, without undue experimentation, adapt the algorithms and methods set forth below to other modalities.

For instance, an exemplary bimodal histogram of a MR image could be assumed to have the following landmark configurations:

$L_1=\{pc_1, pc_2, \mu\}$ $L_2=\{pc_1, pc_2, \mu_{50}\}$ \hfill (Equation 2)

$L_3=\{pc_1, pc_2, \mu_{25}, \mu_{50}, \mu_{75}\}$ $L_4=\{pc_1, pc_2, \mu_{10}, \mu_{20}, \ldots, \mu_{90}\}$, where $\mu_p$, for $p \in \{10, 20, \ldots, 90, 25, 75\}$, represents the pth percentile in the histogram associated with the foreground part of a given image, and $\mu$ represents its second mode. For any image $\mathcal{V}_i$, the notations, $p_{1i}$ and $p_{2i}$ are used to indicate the image intensities corresponding to the percentiles $pc_1$ and $pc_2$, respectively, of the histogram of $\mathcal{V}_i$. The notation $\mu_{1i}, \mu_{2i}, \ldots, \mu_{1i}$ is used to denote the image intensities in $\mathcal{V}_i$ corresponding to the landmarks, other than $pc_1$ and $pc_2$, that are derived from $\mathcal{V}_i$ from among those defined in Equation 2. For example, for the set $L_3$, $\mu_{1i}, \mu_{2i}, \mu_{3i}$ represent the intensities corresponding to the 25th, 50th and 75th percentiles of the histogram of the foreground of $\mathcal{V}_i$, respectively.

1.3 Overview of the Standardizing Method

The standardizing method consists of two steps. In the first ("training") step, a set of images of the same body region and protocol corresponding to a population of patients is provided as input. The parameters of a histogram transformation are "learnt" from these image data and a few additional input parameters are determined. These additional parameters may vary, and are used to fine-tune the transformation to the protocol, the body region and, if desired, the application that will work on the transformed data. This step needs to be executed only once for a given protocol and for a given body region. In the second ("transformation") step, the images are transformed using the parameters learnt in the first step. The transformation is image-dependent and must be repeated for each image.

Figure 3:
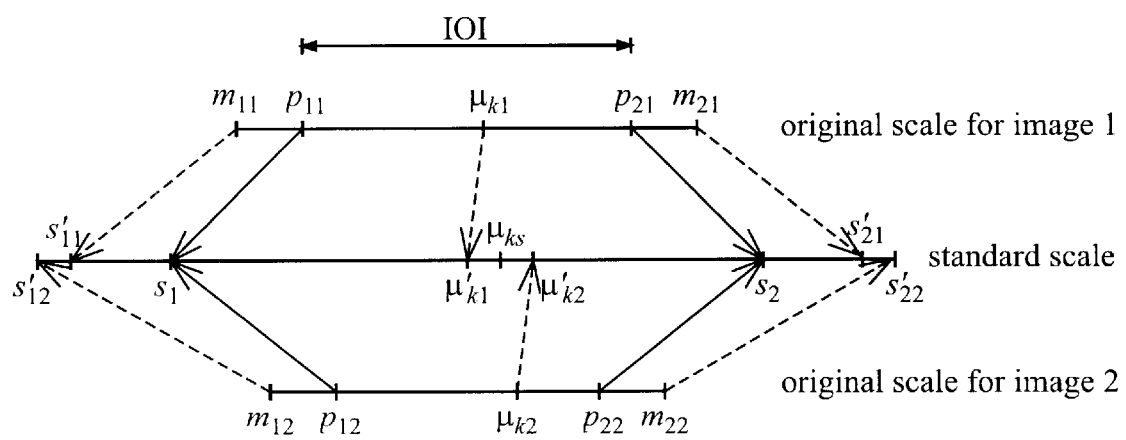
FIG. 3 demonstrates how to find the parameters of the standard histogram. For illustration, only two images are shown. For j=1, 2, the minimum intensity is $m_{1j}$, and the maximum intensity is $m_{2j}$ in the image $V$. The minimum and maximum percentile intensities are $p_{1j}$ and $p_{2j}$, respectively; and $\mu'_{kj}$ is one of the landmarks of the histogram. $\mu'_{kj}$ is the mapped value of $\mu_{kj}$. $\mu_{ks}$ is the mean of the $\mu'_{kj}$ values, which is the actual parameter sought on the standard scale.

In a preferred embodiment of the present invention, the overall approach is as follows: Let the minimum and the maximum intensities on the standard scale for the IOI be $s_1$ and $s_2$, respectively. In the training step, the landmarks ($p_{1j}$, $p_{2j}, \mu_{1j}, \mu_{2j}, \ldots, \mu_{1j}$), obtained (as described later) from each image $V_j$ of a subset of images of $V_{PD}$, are mapped to the standard scale by linearly mapping the intensities from $[p_{1j}, p_{2j}]$ onto $[s_1, s_2]$ (see FIG. 3). The formula for mapping an input intensity value $x \in [p_{1j}, p_{2j}]$ to an output intensity value $x'$ is as follows:

$$x' = s_1 + \frac{x - p_{1j}}{p_{2j} - p_{1j}}(s_2 - s_1) \quad \text{(Equation 3)}$$

Figure 4:
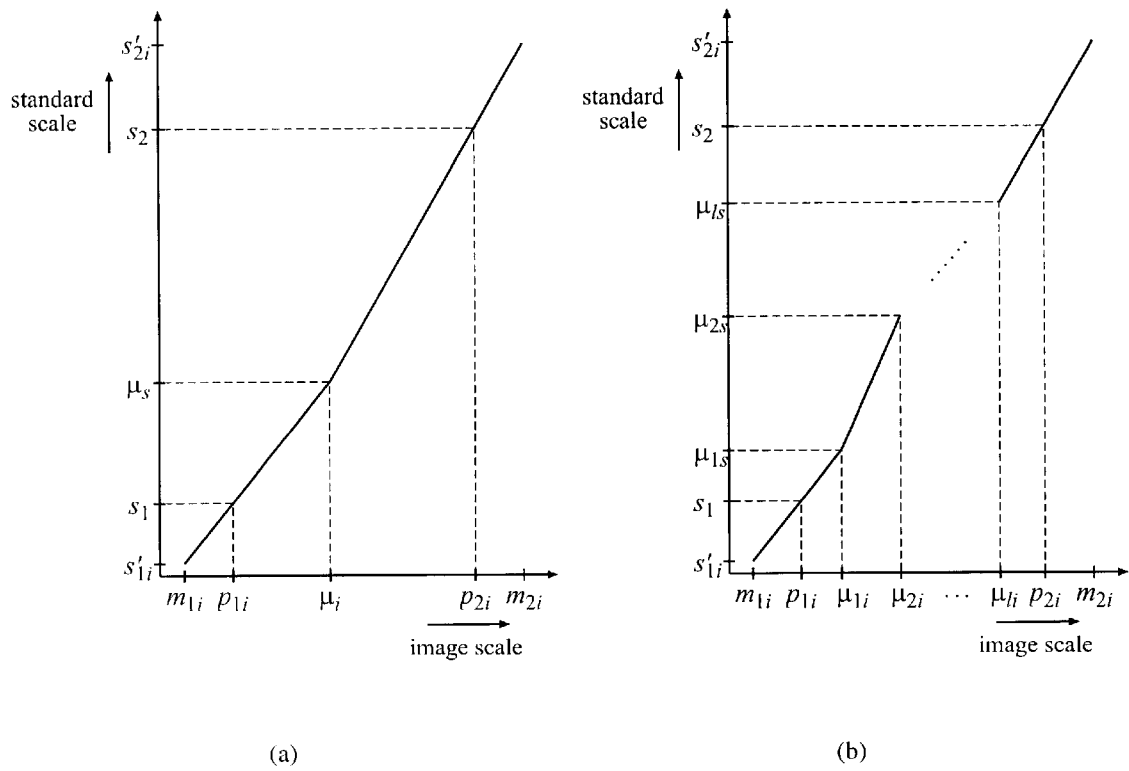
FIG. 4 depicts the intensity mapping function for the transformation phase.

Then, for each k, $1 \leq k \leq l$, the mean $\mu_{ks}$ of the mapped $\mu'_{kj}$s over the images $V_j$ is computed. In the transformation step, for any given image, $V_i = (V_i, g_i) \in V_{PD}$, the actual landmark locations, $\mu_{ki}$, obtained from its histogram, are matched to $\mu_{ks}$ by doing the following separate linear mappings: the first from $[p_{1i}, \mu_{1i}]$ to $[s_1, \mu_{1s}]$, the second from $[\mu_{1i}, \mu_{2i}]$ to $[\mu_{1s}, \mu_{2s}]$, ..., and the last from $[\mu_{1i}, p_{2i}]$ to $[\mu_{1s}, s_2]$, as illustrated in FIG. 4. The transformation for the configuration, denoted $L_1$, is illustrated in FIG. 4(a), whereas FIG. 4(b) demonstrates the general case of l landmarks in addition to $p_{1i}$ and $p_{2i}$. In FIG. 4, $s'_{1i}$ and $s'_{2i}$ represent the actual extreme values on the standard scale. They are determined by the linear mappings of the extreme segments: $[p_{1i}, \mu_{1i}]$ to $[s_1, \mu_{1s}]$ and $[\mu_{1i}, p_{2i}]$ to $[\mu_{1s}, s_2]$. The overall mapping, from $[m_{1i}, m_{2i}]$ of $V_i$ to $[s'_{1i}, s'_{2i}]$ of the standard scale, is referred to as the "standardizer of $V_i$" and is denoted by $\tau_{Vi}$.

The expression for $\tau_{Vi}$, for the configuration denoted $L_1$ (from FIG. 3), is as follows:

$$\tau_{Vi}(x) = \begin{cases} \left\lceil \mu_s + (x - \mu_i) \frac{s_1 - \mu_s}{p_{1i} - \mu_i} \right\rceil, & \text{if } m_{1i} \leq x \leq \mu_i, \\ \left\lceil \mu_s + (x - \mu_i) \frac{s_2 - \mu_s}{p_{2i} - \mu_i} \right\rceil, & \text{if } \mu_i \leq x \leq m_{2i}, \end{cases} \quad \text{(Equation 4)}$$

where $\rceil$, $\lceil$ denotes the "ceiling" or "floor" operator. (These operators convert any real number y to the closest integer Y such that $Y \geq y$ or $Y \leq y$, respectively.) Note that $s'_{1i} = \tau_{Vi}(m_{1i})$, and $s'_{2i} = \tau_{Vi}(m_{2i})$. The image $V_{si} = (V_i, g_{si})$ resulting from the standardizing mapping of $V_i$ is given by the following. For all $v \in V_i$, $$g_{si}(v) = \tau_{Vi}(g_i(v)). \quad \text{(Equation 5)}$$

The "free ends," characterized by the values of $s'_{1i}$ and $s'_{2i}$ of the standard scale, depend on the given image $V_i$. By "free ends" is meant the two ends of the standard scale for the image that is being transformed. For example, $s'_{1i}$ and $s'_{2i}$ represent the two ends of the standard scale for image $V_i$. Since the ends depend on the particular image being transformed, they are marked with a prime (') to distinguish them from $s_1$ and $s_2$, which are fixed for all images. In other words, the range $[s'_{1i}, s'_{2i}]$ may vary from image to image. However, $[s_1, s_2]$ is independent of $V_i$, and this is the interval within which a uniformity of intensity meaning is achieved.

In order to find $\mu_{1i}, \mu_{2i}, \ldots, \mu_{1i}$ for a given image $V_i$, the foreground part of the image must be roughly identified. In an image of a head of a patient, for example, this part corresponds roughly to the set of all voxels that fall within the region of the head. One of several simple, known methods can be utilized for this purpose, including the method of the preferred embodiment, "thresholding." The "threshold" is chosen to be the overall mean intensity in the whole image. The method of background removal described in Udupa et al., *IEEE Trans. Med. Imaging*, 1997 can also be used. Hundreds of studies have already been successfully processed automatically using this method in a variety of different protocol and body region combinations, confirming the operability of the preferred foreground extraction method.

1.4 Training and Transformation Algorithms

The training and transformation algorithms follow that were used in the exemplified standardizing method. Both algorithms are straightforward and require no special data structures or optimization in implementation. The subscript "j" defines the input images for parameter estimation, as opposed to the input images for transformation, which are identified by subscript "i."

Algorithm 1. Training

Input: A set of images $V_j$ (j=1, 2, ..., N) that is a subset of $V_{PD}$ for some fixed $P \in \mathcal{P}$ and $D \in \mathcal{D}$, the histogram parameters $pc_1$, $pc_2$, and $s_1$, $s_2$ and $L \in \{L_1, L_2, L_3, L_4\}$.
Output: $\{\mu_{ks} | 1 \leq k \leq l\}$.
begin
1. for j=1 to N do
2. compute the histogram $\mathcal{H}_j$ of $V_j$;
3. determine intensity values $p_{1j}$ and $p_{2j}$ corresponding to $Pc_1$ and $pc_2$ and the landmark locations $\mu_{1j}, \mu_{2j}, \ldots, \mu_{1j}$ on $\mathcal{H}_j$ (see Section "Choosing the Landmark Configuration" below);
4. map $[p_{1j}, p_{2j}]$ of $\mathcal{H}_j$ onto $[s_1, s_2]$ linearly;
5. find the new mapped landmark locations $\mu'_{1j}, \mu'_{2j}, \ldots, \mu'_{1j}$;
6. endfor;
7. calculate the rounded means $\mu_{1s}, \mu_{2s}, \ldots, \mu_{1s}$ of $\mu'_{1j}, \mu'_{2j}, \ldots, \mu'_{1j}$, respectively, over j=1, 2, ..., N;
end Algorithm 2. Transformation Input: An image $V_i \in V_{PD}$, $pc_1$, $pc_2$, $s_1$, $s_2$, $\mu_{1s}, \mu_{2s}, \ldots, \mu_{1s}$.
Output: The transformed image $V_{si}$ and/or a lookup table (LUT) that stores the standardizer $\tau_{Vi}$.
begin
1. compute the histogram $\mathcal{H}_i = (G_i, h_i)$ of $V_i$;
2. determine intensity values $p_{1i}$ and $p_{2i}$, corresponding to $pc_1$ and $pc_2$ and the landmark locations $\mu_{1i}, \mu_{2i}, \ldots, \mu_{1i}$ on $\mathcal{H}_i$ (see Section "Choosing the Landmark Configuration" below);
3. map sections of the scale of $\mathcal{H}_i$ linearly according to FIG. 4 to the standard scale $G_s$ of the standard histogram $\mathcal{H}_s = (G_s, h_s)$;
4. map the intensity value of every voxel $v \in V_i$ according to $\tau_{Vi}$ to get $V_{si}$ and/or output the mapping $\tau_{Vi}$ in an LUT;
end 2. The Variants 2.1 Choosing the Standardization Parameters Although once the training step is completed, the corresponding transformation step is fully determined, there are several possibilities for tailoring the standardizer to the specific needs of an application. For example, $s_1$ must not be 0 if the values below $p_1$ need to be distinguished from "nothing" (i.e., value 0). Further, $s_2$ must be large enough not to compress the parts of the histograms (i.e., not to merge neighboring intensities after the transformation). When $pc_1 > 0$ and/or $pc_2 < 100$, the values in $[m_{1i}, p_{1i}]$ and $[p_{2i}, m_{2i}]$ must be mapped to $[s'_{1i}, s_1]$ and $[s_2, s'_{2i}]$, respectively, where $s'_{1i}$ and $s'_{2i}$ are determined by applying the mapping in the two adjacent linear sections as illustrated in FIG. 4.

The standard scale that includes the open ends $[s'_{1i}, s_1]$ and $[s_2, S'_{2i}]$ is referred to as "open." When only the intensities in $[s_1, s_2]$ are considered, the scale is referred to as "closed."

2.2 Choosing the Landmark Configuration

Figure 5:
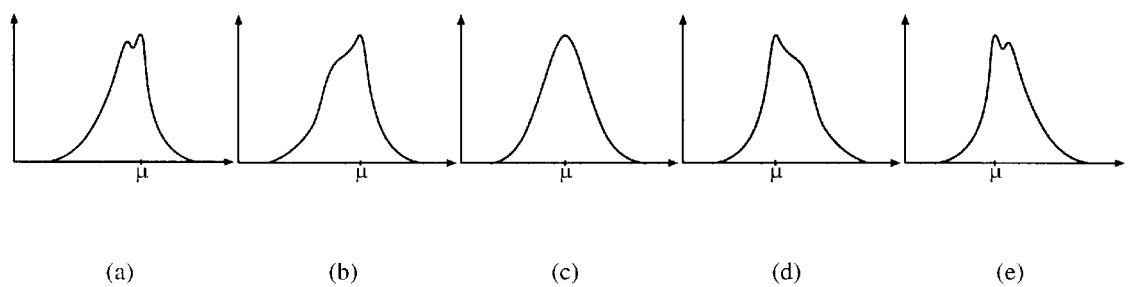
FIG. 5 depicts a schematic representation of the shapes of brain MRI histograms set forth as FIG. 5(a) through FIG. 5(e). For clarity, only the histogram corresponding to the foreground (brain) is shown.

The choice of the actual landmark configuration is also an important factor in the present invention. The mode-based method (configuration $L_1$) works fine for certain MR protocols and several body regions for several applications, but there are cases (and applications) for which this simple method is not appropriate. For illustration, the shape of the gray matter (GM), white matter (WM), and cerebrospinal fluid (CSF) distributions in FSE Pd brain images are examined. Their relative locations vary among studies and even among subsequent studies of the same patient. FIG. 5 shows a variety of histogram shapes, each of which was found in the histograms of Multiple Sclerosis brain patient studies, recognizing, of course, that in FSE Pd images, GM regions are brighter than WM regions.

Mainly the WM and GM distributions combine to give the histogram hump illustrated in FIG. 5, while the CSF distribution falls in the lower tail of this hump. The weakness of the mode-based method is that sometimes the mode (the intensity corresponding to the peak), denoted $\mu_i$ in FIG. 4(a), corresponds to GM intensity (FIGS. 5(a) and (b)) in other cases it corresponds to WM intensity (FIGS. 5(d) and (e)), or it may correspond to intensities that lie between real GM and WM intensities (FIG. 5(c)). Therefore, when the mode is matched to a fixed location on the standard scale, GM is matched in some cases and WM in other cases.

Because of this "switching" behavior, the mode-based method is often not appropriate if the application is image segmentation, where more accurate meaning on the standard scale is needed, even for relatively small ranges, although for display window settings this behavior does not cause many problems. In order to eliminate the "switching" behavior, a preferred approach involves choosing the median of the histogram of the foreground as a landmark to match (configuration $L_2$). Since the background and the noise (above the high percentile) are removed, this landmark remains consistent, even in cases where the histogram has two similar peaks (FIGS. 5(a) and (e)), and an asymmetric shape (FIGS. 5(b) and (d)).

In other embodiments of the invention, other histogram landmarks, such as quartiles and deciles (configuration $L_3$ and $L_4$, respectively), are selected to better define the standard histogram. In these percentile-based methods, in addition to the "cut-off" percentiles $p_{1i}, p_{2i}$, several percentile markers $\mu_{1i}, \mu_{2i}, \ldots, \mu_{1i}$ are selected within the IOI. In the case of quartiles, l=3, and $\mu_{1i}, \mu_{2i}, \mu_{3i}$, correspond to the 25th, 50th, and 75th percentiles within the IOI, respective. In the case of deciles, l=9, and $\mu_{1i}, \mu_{2i}, \ldots, \mu_{9i}$, correspond to the 10th, 20th, ..., 90th percentiles, respectively.

2.3 Choosing the Mapping Function

There are other changes to the basic standardizing method that can be used to make it better fit the type of input data and the actual application, for example: (i) by using histogram landmarks defined in different ways (i.e., not by percentiles), (ii) by using polynomial functions to "stretch" the histogram segments, and (iii) by using spline fitting techniques instead of segment-by-segment linear "stretching." When these variants are used, changes are required in Step 3 of Algorithm 2, wherein the segment-wise linear mapping should be replaced by the actual mapping used.

3. Theory

A theory and accompanying set of theorems set forth by Nyul and Udupa, in *Proc. SPIE Medical Imaging*, San Diego, Calif., February 1999, vol. 3658, and herein incorporated by reference, are applied to configuration $L_1$, for guiding the selection of $s_1$ and $s_2$ so that no two distinct input intensities are merged, and the order of the input intensities is maintained upon transformation. This theory also applies, without modification, to configuration $L_2$. It can further be easily generalized to apply to configurations $L_3$ and $L_4$.

To better understand the principles underlying the present invention, the theory for configuration $L_1$ is outlined below, and the relevant theorems are stated without proofs. The following definitions are necessary for stating the theorems that guarantee the correct behavior of the standardizer. Let $$\mu'_{min} = \min_{V_i \in V_{PD}} \{\mu'_i\}, \qquad \text{(Equation 6)}$$

and $$\mu'_{max} = \max_{V_i \in V_{PD}} \{\mu'_i\}. \qquad \text{(Equation 7)}$$

Note that $\mu'_{min}$ and $\mu'_{max}$ are dependent on $s_1$ and $s_2$. Let l, L, r, and R be indexes such that $$\mu_l - p_{1l} = \min_{V_i \in V_{PD}} \{(\mu_i - p_{1i})\}, \qquad \text{(Equation 8)}$$

$$\mu_L - p_{1L} = \max_{V_i \in V_{PD}} \{(\mu_i - p_{1i})\}, \qquad \text{(Equation 9)}$$

$$p_{2r} - \mu_r = \min_{V_i \in V_{PD}} \{(p_{2i} - \mu_i)\}, \qquad \text{(Equation 10)}$$

$$p_{2R} - \mu_R = \max_{V_i \in V_{PD}} \{(p_{2i} - \mu_i)\}. \qquad \text{(Equation 11)}$$

Moreover, an assumption is made throughout, that $pc_1$ and $pc_2$ are such that for any $V_i \in V_{PD}$, $$p_{1i} \leq \mu_i \leq p_{2i}. \qquad \text{(Equation 12)}$$

Three theorems (see Nyul and Udupa, 1999, supra, for proofs) are crucial to guarantee the correct behavior of the standardizer, $\tau_{Vi}$, for any given image $V_i$ in the present invention. Theorem 1 states the conditions under which it is guaranteed that no two distinct intensities in $V_i$ are merged into a single intensity in the standardized image $V_{si}$. Thus, if standardizing is done respecting these conditions, then there is no loss of information, and the original image can be obtained by inverting the standardizer $\tau_{Vi}$.

THEOREM 1. For any protocol $P \in \mathcal{P}$, any body region $D \in \mathcal{D}$, any image $V_i \in V_{PD}$, and for any $pc_1$ and $pc_2$, such that Equation 12 is satisfied, the standardizer $\tau_{Vi}$ of $V_i$ is a one-to-one mapping if $$\mu'_{min} - s_1 \geq \mu_L - p_{1L}, \qquad \text{(Equation 13)}$$

and $$s_2 - \mu'_{max} \geq p_{2R} - \mu_R. \qquad \text{(Equation 14)}$$

This theorem provides guidance for selecting the values of $s_1$ and $s_2$ such that there will be no intensity loss.

THEOREM 2. For any protocol $P \in \mathcal{P}$, any body region $D \in \mathcal{D}$, any image $V_i \in V_{PD}$, and for any $pc_1$ and $pc_2$, such that Equation 12 is satisfied, the standardizer, $\tau_{Vi}$, of $V_i$ is a one-to-one mapping if $$s_2 - s_1 > (\mu_L - p_{1L} + p_{2R} - \mu_R) \cdot \max\left\{\frac{\mu_L - p_{1L}}{\mu_l - p_{1l}}, \frac{p_{2R} - \mu_R}{p_{2r} - \mu_r}\right\} \quad \text{(Equation 15)}$$

Note that Theorems 1 and 2 state conditions that require observing all images in $V_{PD}$. In practice, since this is impossible, the right side of Equation 15 is estimated by examining a sufficient number of images, and set $s_2-s_1$ to a number sufficiently greater than this estimated entity. The implemented software is set up to provide a warning message should an image be encountered for which Equation 15 is violated. Even if a violation were to occur, the software can be adapted such that, when a violation is detected, $s_2-s_1$ is automatically updated so that Equation 15 is indeed satisfied.

Consequently, in testing 100 proton density (Pd) volume images of the brain of different patients, acquired by a fixed fast-spin-echo protocol, using two GE 1.5T scanners, it was determined that $\mu_L-p_{1L}=1139$, $p_{2R}-\mu_R=960$, $\mu_1-p_{1l}=693$, and $p_{2r}-\mu_r=502$ for $pc_1=0$ and $pc_2=99.8$. By Equation 15, this demonstrates that, when $s_1=1$, if $s_2$ is set to at least 4016, then the mapping is necessarily lossless (though probably in many cases a smaller value would be sufficient). In all embodiments of the present invention, $s_2=4095$. In practice, this choice has proven adequate in all protocols, and it is highly unlikely that it could lead to a lossy mapping, at least for any proton density brain images acquired in accordance with the present acquisition protocol.

Figure 6:
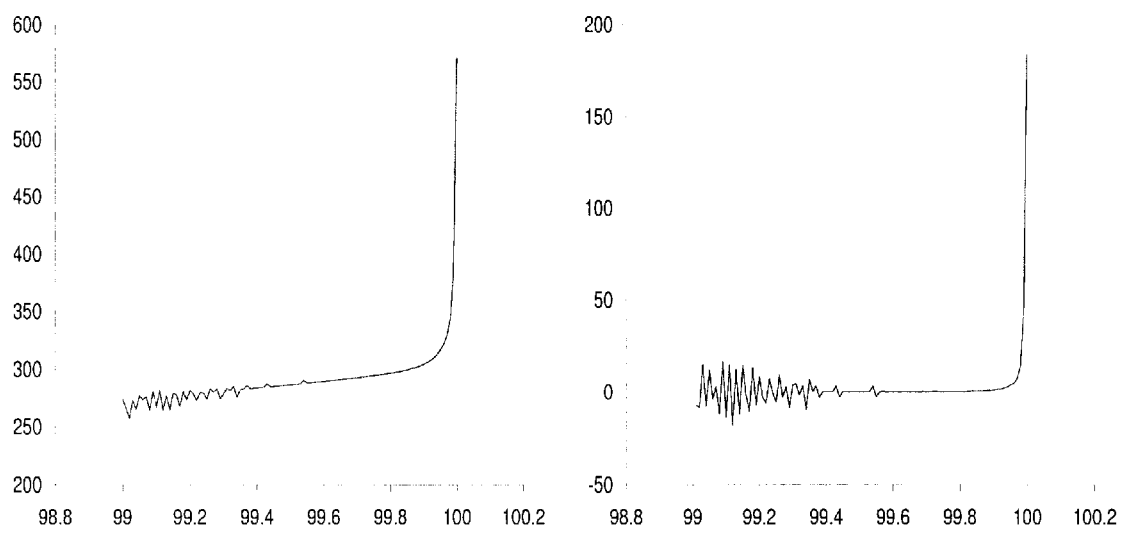
FIG. 6 is a plot of the standard deviation of $p_{2i}$ of images versus $p_{c2}$ (FIG. 6(a)), and the first derivative of that function (FIG. 6(b)).

The maximal percentile, $pc_2=99.8$, was selected by the following experiments. Based upon a random selection of a few FSE Pd brain images, acquired in accordance with the preceding protocol, $pc_1$ was fixed at $pc_1=0$. Then $p_{2i}$ was computed for several values of $pc_2$ (in steps of 0.05, between 99.0 and 100.0) for each test image $V_i$. The value of $pc_2$ was selected to be the largest value at which the variation in $p_{2i}$, with respect to changes in $pc_2$, reached an acceptably small value ($pc_2=99.8$ is approximately the largest value at which the derivative is still small (0.5)). FIG. 6 shows the plot of the standard deviation of $p_{2i}$ for the images in the test set versus $pc_2$ (FIG. 6(a)) and the derivative of that function (FIG. 6(b)). The value, $pc_2=99.8$, corresponds to the shoulder in the graph on the right, at which point the function starts increasing rapidly. This indicates that beyond the selected $pc_2$ value, the variations in intensities are no longer systematic, but become random.

Extensive experimentation has shown that the choice of $pc_2=99.8$, as well as the scale $[s_1, s_2]=[1, 4095]$ is also adequate for FSE T2, T1E, SE Pd and T2 images.

Theorem 3 states that, once the conditions of Theorem 1 are satisfied, the order of the input intensities is maintained in the output images.

THEOREM 3. For any protocol $P \in \mathcal{P}$, any body region $D \in \mathcal{D}$, any image $V_i \in V_{PD}$, any standardizer $\tau_{Vi}$ of $V_i$ that satisfies Equation 15, and for any intensities $x_1$ and $x_2$ of $V_i$, $\tau_{Vi}(x_1) < \tau_{Vi}(x_2)$ if, and only if, $x_1 < x_2$.

That is, the actual order of brightness of the tissue regions in $V_i$ is maintained in the image $V_{si}$ output by Algorithm 2, although their relative contrast may change. Thus, the intensity characteristics of $V_{si}$ are in complete agreement with the characteristics of $V_i$ that are known to be associated with protocol P. (Note that, if $x_1=x_2$, then $\tau_{Vi}(x_1)=\tau_{Vi}(x_2)$ is guaranteed by Equation 4.) In a Pd image of a brain, for example, the known brightness relationship gray matter> white matter> CSF is maintained in $V_{si}$. The relative contrast between these regions, however, may change.

EXAMPLES

Demonstrating the underlying principle that, for any given protocol, $P \in \mathcal{P}$, and for any body region, $D \in \mathcal{D}$, the standardized images, $V_{si}$, have more consistent tissue meaning for image intensities than the images, $V_i$, before standardization, the following examples further confirm that the preferred methods of the present invention allow for the following variations in image data for differing protocols P and body regions D:

(i) intra-patient (time-to-time) variation,
(ii) inter-patient variation,
(iii) variations among different machines of the same brand, and
(iv) variations among machines of different brands.

To verify the effectiveness of the preferred methods of the present invention, they have been rigorously tested for a variety of protocols in a representative body region, and for the most relevant of the factors indicated above. Qualitative evidence follows, which confirms the validity of the method through display examples, before and after standardization, for the factors above for several P and D. Image display examples demonstrate that the consistency of the brightness level and contrast of images is considerably improved after standardization. In addition, tissues are shown to have much more consistent intensity ranges if the percentile-based variants of the standardizing method are used. Moreover, quantitative evidence demonstrates that the scanner dependent intra- and inter-patient intensity variations are substantially reduced after standardization.

Example 1

Qualitative Comparisons

Table 1 shows the different parameter settings that were used for the methods in carrying out the comparisons. For simplicity, the methods are referred to by numbers. 0 identifies the identity transformation (i.e., no transformation at all). Experiments were also done with other high percentiles (i.e., 100, 99.5 and 99.0). Further, in all cases, standardization mapping was verified to be lossless.

First, display examples are illustrated with images before and after the different transformations for several P and D; then, quantitative studies are described with illustrating tables. For all tests, segment-wise linear mapping was used. The training was done by using 10 different patient studies (using volume images) of the particular protocol and body region.

Qualitative comparisons were made for the following MRI protocols and body regions: FSE Pd, FSE T2, spin-echo (SE) Pd, SE T2, T1 with Gadolinium enhancement (T1E), and an SPGR sequence, all for the brain; a TI-weighted gradient-echo sequence for the foot. Thirty (30) studies each of FSE Pd, FSE T2 and T1E, and 10 studies each of SE Pd, SE T2, T1 GRE and SPGR were transformed using the corresponding "trained" parameters. Within any of these protocols, the image acquisition parameters were identical for all patient studies. The parameters for training were chosen as shown in Table 1.

TABLE 1

Parameter configurations used in the different comparisons.

| Method | $pc_1$ | $pc_2$ | $s_1$ | $s_2$ | Scale type | Landmarks |
|---|---|---|---|---|---|---|
| 0 | — | — | — | — | — | None |
| 1 | 0 | 99.8 | 1 | 4095 | Open | Mode |
| 2 | 0 | 99.8 | 1 | 4095 | Open | Median |
| 3 | 0 | 99.8 | 1 | 4095 | Open | Quartiles |
| 4 | 0 | 99.8 | 1 | 4095 | Open | Deciles |

Figure 7:
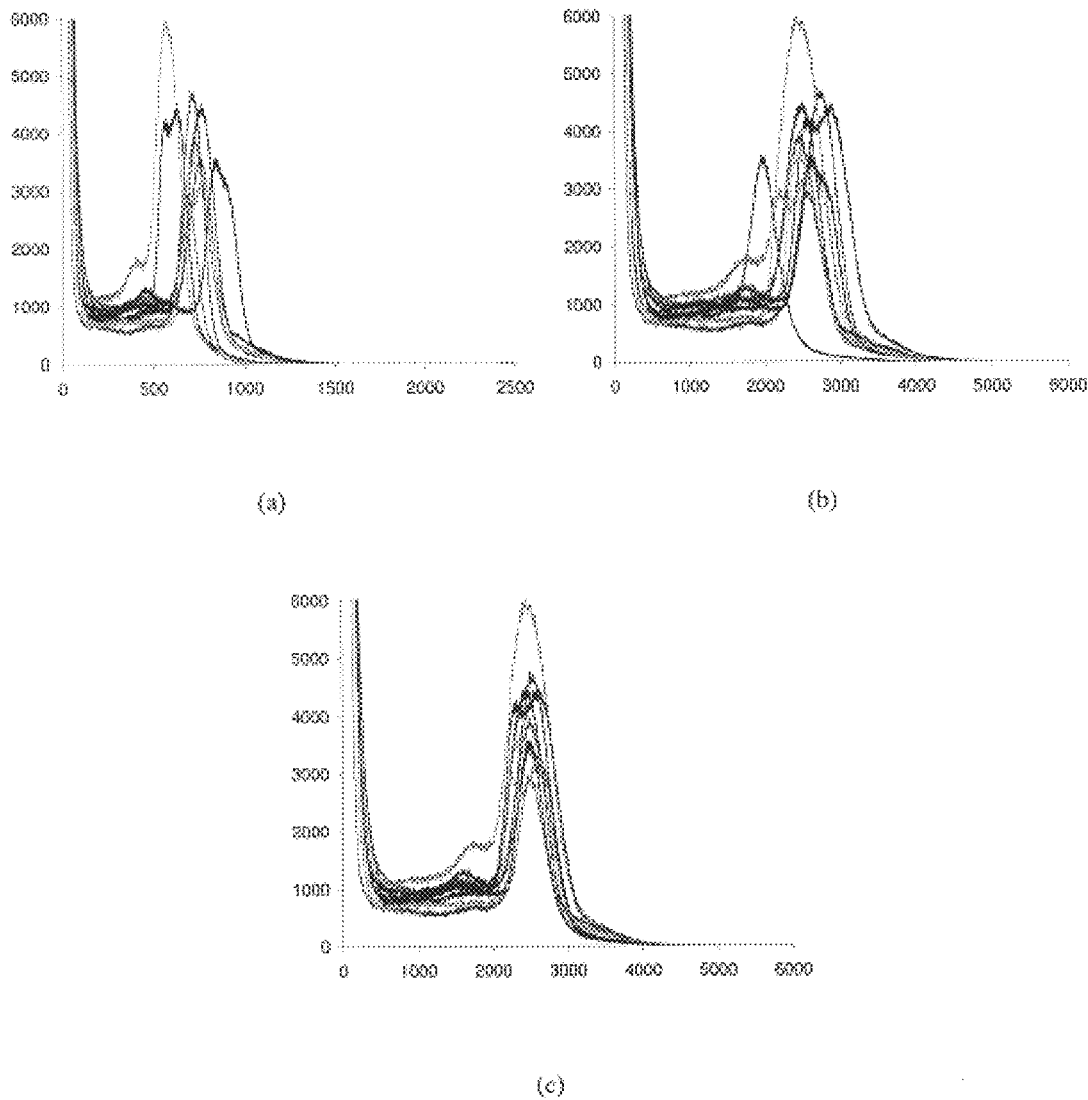
FIGS. 7(a)–(c) depicts histograms at different stages of the standardization process for 10 different FSE Pd studies. Original histograms are shown as FIG. 7(a). Histograms after intensity scaling from $[p_{1i}, p_{2i}]$ to $[s_1, s_2]$, wherein $s_1$=1, and $s_2$=4095, are shown as FIG. 7(b), and final standardization are shown as FIG. 7(c).

Histograms of the 10 FSE Pd studies at different stages of the transformation are displayed in FIG. 7. The low intensity part of the histograms, corresponding to the background voxels, has been removed from the display in order to show the intensity of interest on a better scale. Original histograms of the images are plotted in the top left graph (FIG. 7(a)). The top right graph (FIG. 7(b)) displays the histograms of the image after a simple linear mapping of $[p_{1i}, p_{2i}]$ to $[s_1, s_2]$, wherein $pc_1=0$ and $pc_2=99.8$. Histograms after the final standardizing mapping are plotted in the graph at the bottom (FIG. 7(c)). A visual comparison shows that the histograms are more similar in shape and locations after standardization than before, indicating that the actual intensity values and their distribution in the images are more similar after standardization. The simple linear mapping illustrated in FIG. 7(b) that accounts for outlier intensities indicates that it is not enough in making the histograms cluster. By "clustering" of the histograms is meant that the predominant humps of the histograms are closely grouped, as shown in the lower graph in FIG. 7(c).

Example 2

Display at Fixed Windows

Figure 8:
FIG. 8 depicts images displayed at fixed gray level windows. Rows 1–5 correspond to methods 0–4. In each row, a slice from the Pd studies of three MS patients is displayed.

Images in each row of FIG. 8 depict a slice from each of three different patient FSE Pd studies. The rows from top to bottom correspond to methods 0 through 4. For each method, the images are displayed at a fixed window setting. For method 0, the window was set up correctly (visually) for the first image. For other methods, "standard" fixed window settings were set up, as listed in Table 2, by examining various standardized studies.

TABLE 2

Standard windows for the brain for using a variety of different protocols and methods.

| | FSE Pd | | FSE T2 | | T1E | | SE Pd | | SE T2 | |
|---|---|---|---|---|---|---|---|---|---|---|
| Method | level | width | level | width | level | width | level | width | level | width |
| 1 | 2510 | 3444 | 2306 | 4523 | 2048 | 3500 | — | — | — | — |
| 2, 3, 4 | 2460 | 3444 | 2446 | 4523 | 2048 | 3500 | 2812 | 4095 | 2327 | 4095 |

Similar tables could be readily constructed in the manner shown for other protocols and body regions by one of ordinary skill in the art using known information and protocols.

FIG. 8 demonstrates that the structures were well portrayed and that the contrast was more similar for methods 1–4 than for method 0. Since the intensity ranges are quite different for the three studies, the displays for method 0 exhibited inadequate window settings for the second and third study. Striking similarity was found in the displays among methods 1–4.

Figure 9:
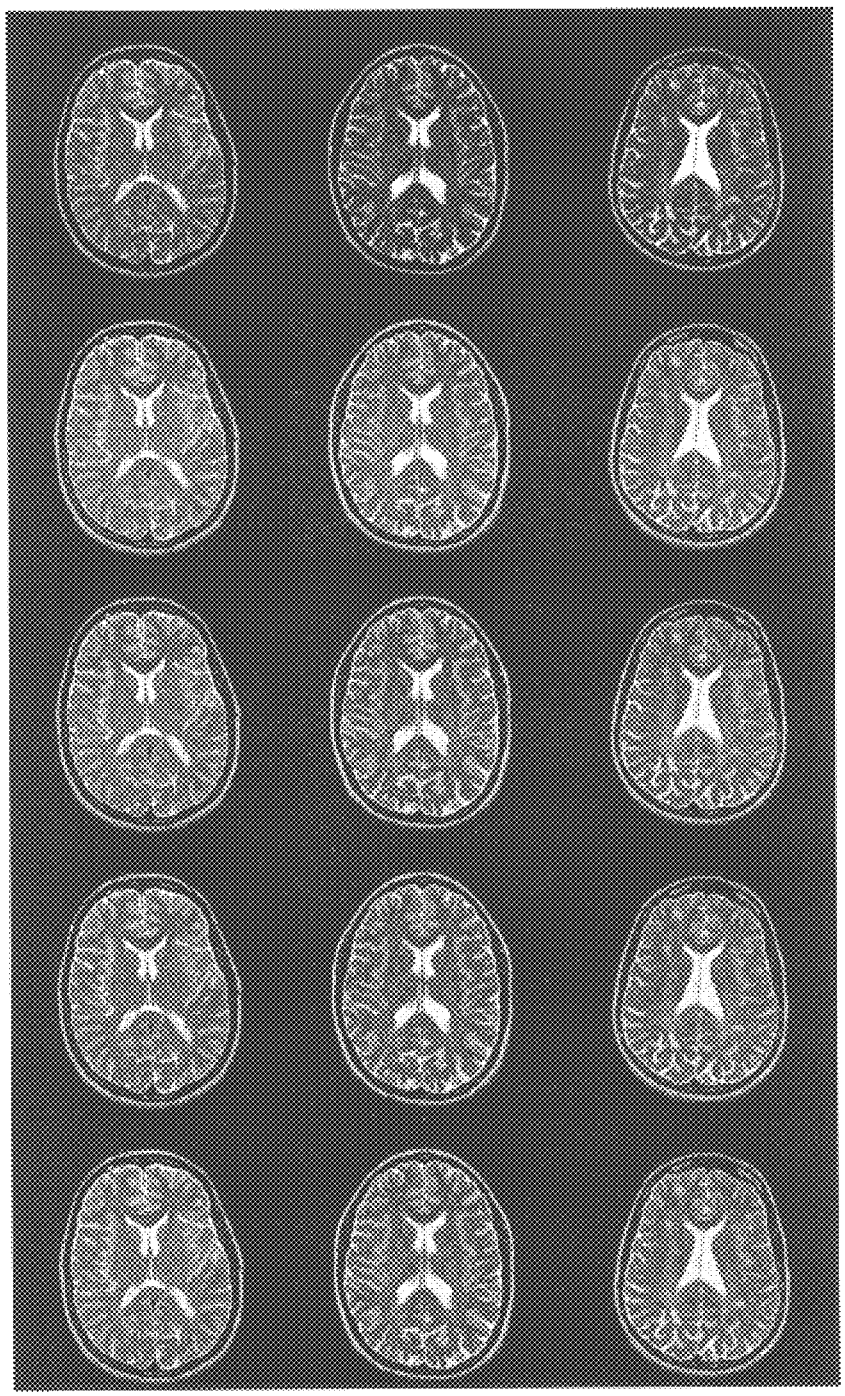
FIG. 9 depicts images displayed at fixed gray level windows. Rows 1–5 correspond to methods 0–4. In each row, a slice from the T2 studies of three MS patients is displayed.
Figure 10:
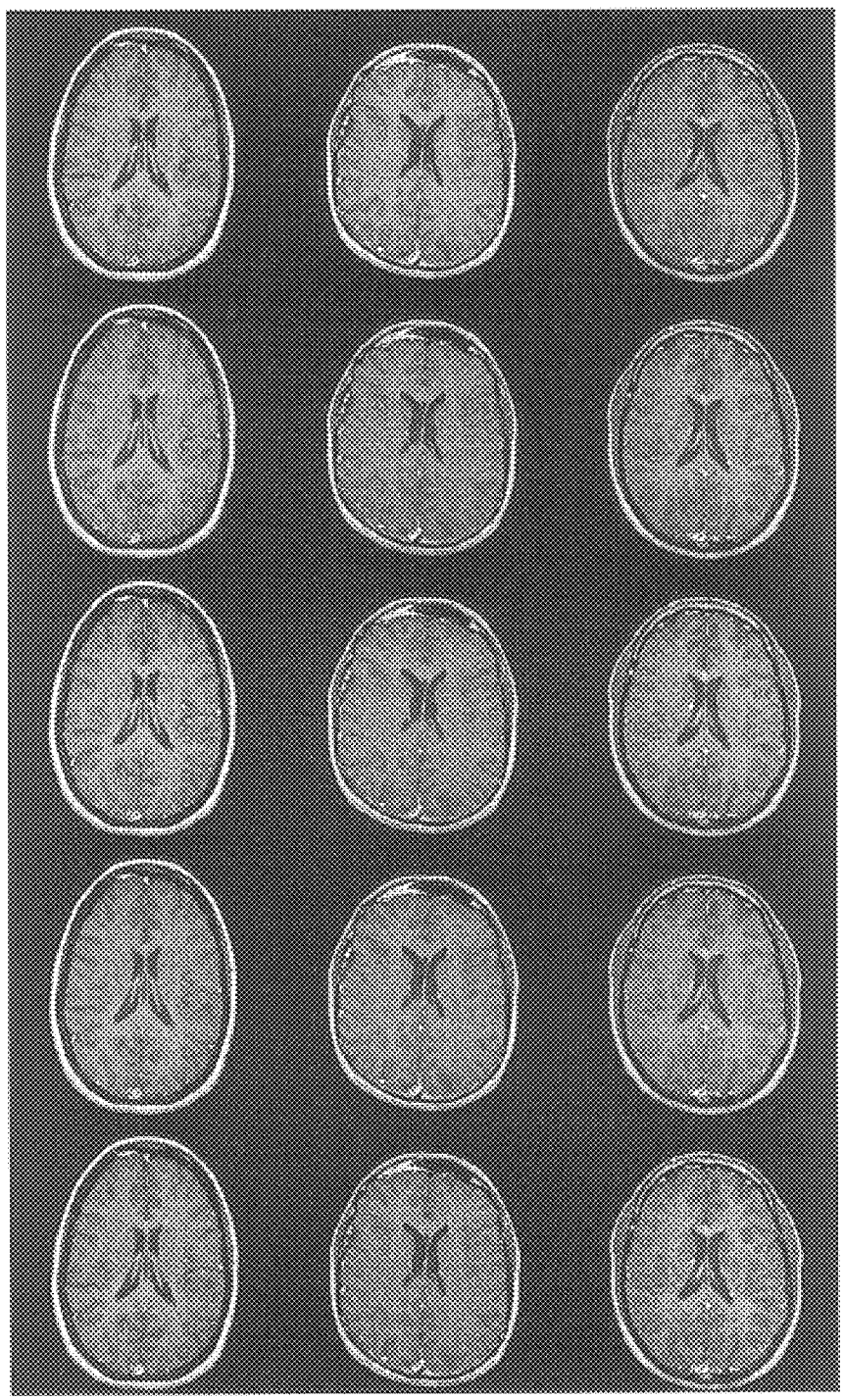
FIG. 10 depicts images displayed at fixed gray level windows. Rows 1–5 correspond to methods 0–4. In each row, a slice from the T1E studies of three MS patients is displayed.

FIGS. 9 and 10 are analogous to FIG. 8, showing images before and after standardization for FSE T2 and T1E images. Each set was acquired using the same protocol. The rows from top to bottom correspond to methods 0 through 4. For each method, the images were displayed at a fixed window setting. For method 0, the window was set up correctly (visually) for the first image. For other methods, "standard" fixed window settings were devised, as listed in Table 2, by examining a variety of standardized studies. As shown in FIGS. 9 and 10, the structures are well portrayed and the contrast is more similar for methods 1–4 than for method 0, although the difference is not striking as that for the FSE Pd images.

Example 3

Comparing Effects of the Standardizer in Images of a Foot

Figure 11:
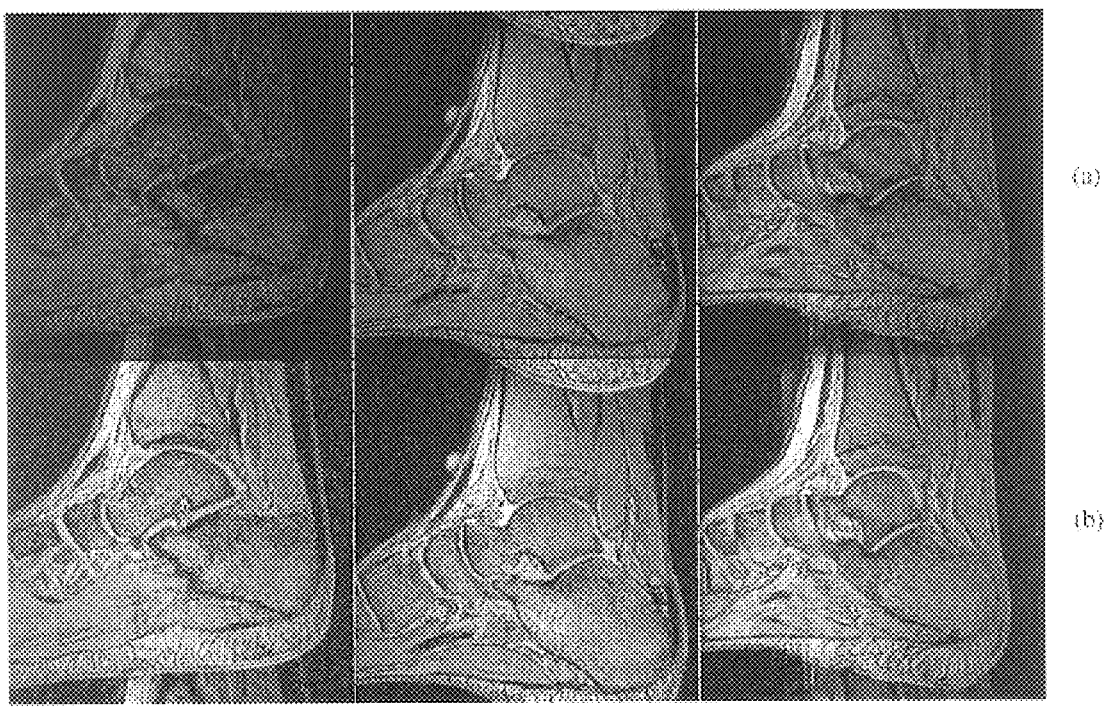
FIG. 11 depicts images of three foot studies.

FIG. 11 depicts the improvements resulting from standardization for a different body region, namely the foot. The imaging protocol in this case was a T1-weighted gradient-echo sequence and was the same for the three studies. Images in each row of FIG. 11 show a slice from each of three different studies. Images in the top row (FIG. 11(a)) are displayed at their "default" window (i.e., window level set to the middle of the full range, and window width set to the full range of intensities of the study). The second row (FIG. 11(b)) shows the same slices after standardization with method 2, displayed using a fixed window setting.

Example 4

Comparing Effects of the Standardizer when Deviations Exist in Test Images

Figure 12:
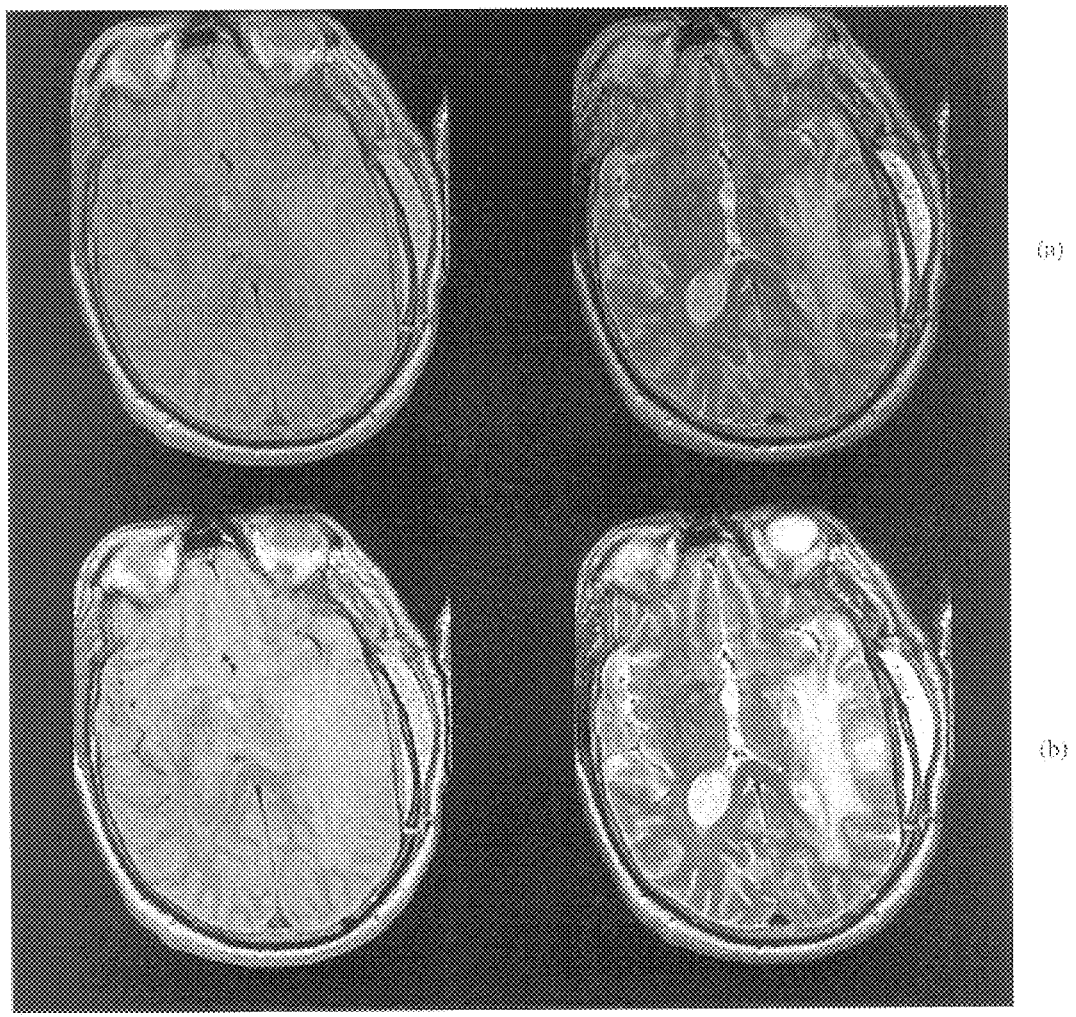
FIG. 12 depicts original slices, before standardization of data sets of a patient's brain with a large tumor displayed at default windows (FIG. 12(a); and after standardization, displayed at a standard window setting (FIG. 12(b) listed in Table 2 for the FSE Pd (first column) and T2 (second column) case for method 2 (see Table 1).

As shown in FIG. 12, the standardizer works even when substantial deviations exist in the test images, as compared to the images used for training. FIG. 12 depicts a data set of the brain of a patient with a large tumor. The first row (FIG. 12(a)) shows a slice of a FSE Pd and a FSE T2 data set before standardization, whereas the second row (FIG. 12(b)) shows the same slices after standardization (method 2). In this case, the standardizer was derived from the training data utilized from the MS patient FSE Pd and T2 images in FIGS. 8 and 9, respectively.

Example 5

Figure 13:
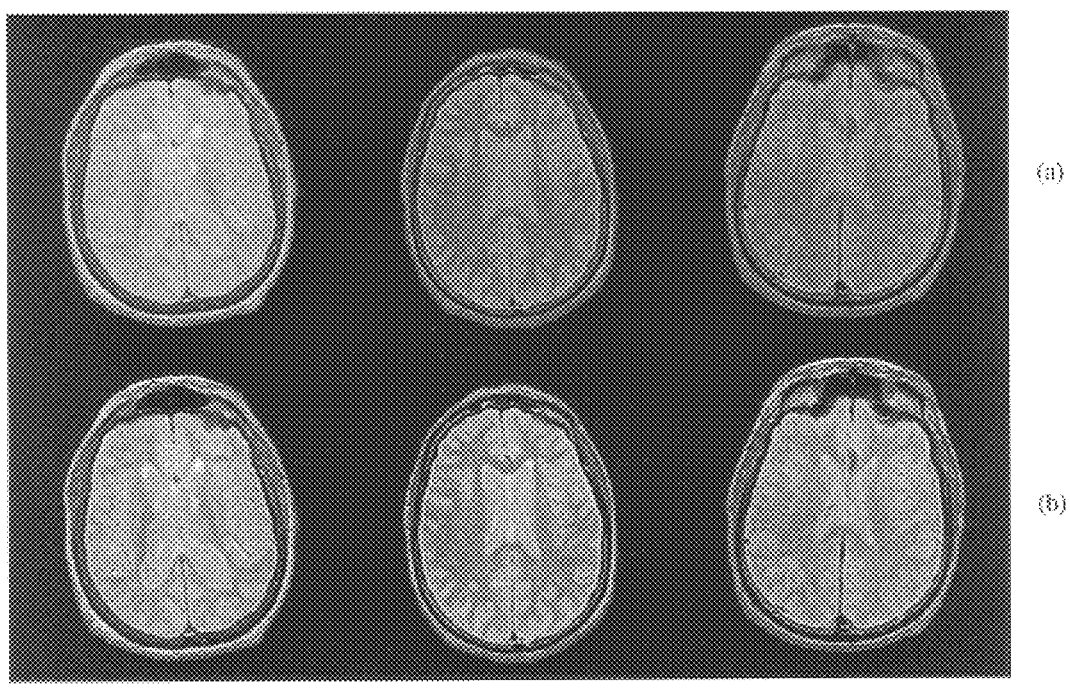
FIG. 13 depicts the results of three (3) SE Pd studies, all acquired per a fixed protocol.

Comparing Effects of the Standardizer when Variations Exist in Protocol Settings In FIG. 13, the method of the invention is shown to be tolerant to small variations in protocol settings, as well as variations that may exist among machines of the same brand in different hospitals. The top row shows three different patient studies obtained from a GE 1.5T Signa scanner at the University of Colorado Health Sciences Center (data courtesy of Dr. Jack Simon) using a SE Pd protocol. Images before standardization (displayed using the default window settings) are shown in the first row (FIG. 13(a)). The second row (FIG. 13(b)) shows the same slices after standardization displayed by using the "standard" window setting from Table 2, however, training was done utilizing the SE Pd image data acquired on a different scanner of the same brand at the Hospital of the University of Pennsylvania.

Example 6

Display as Binary Images at Fixed Thresholds

Figure 14:
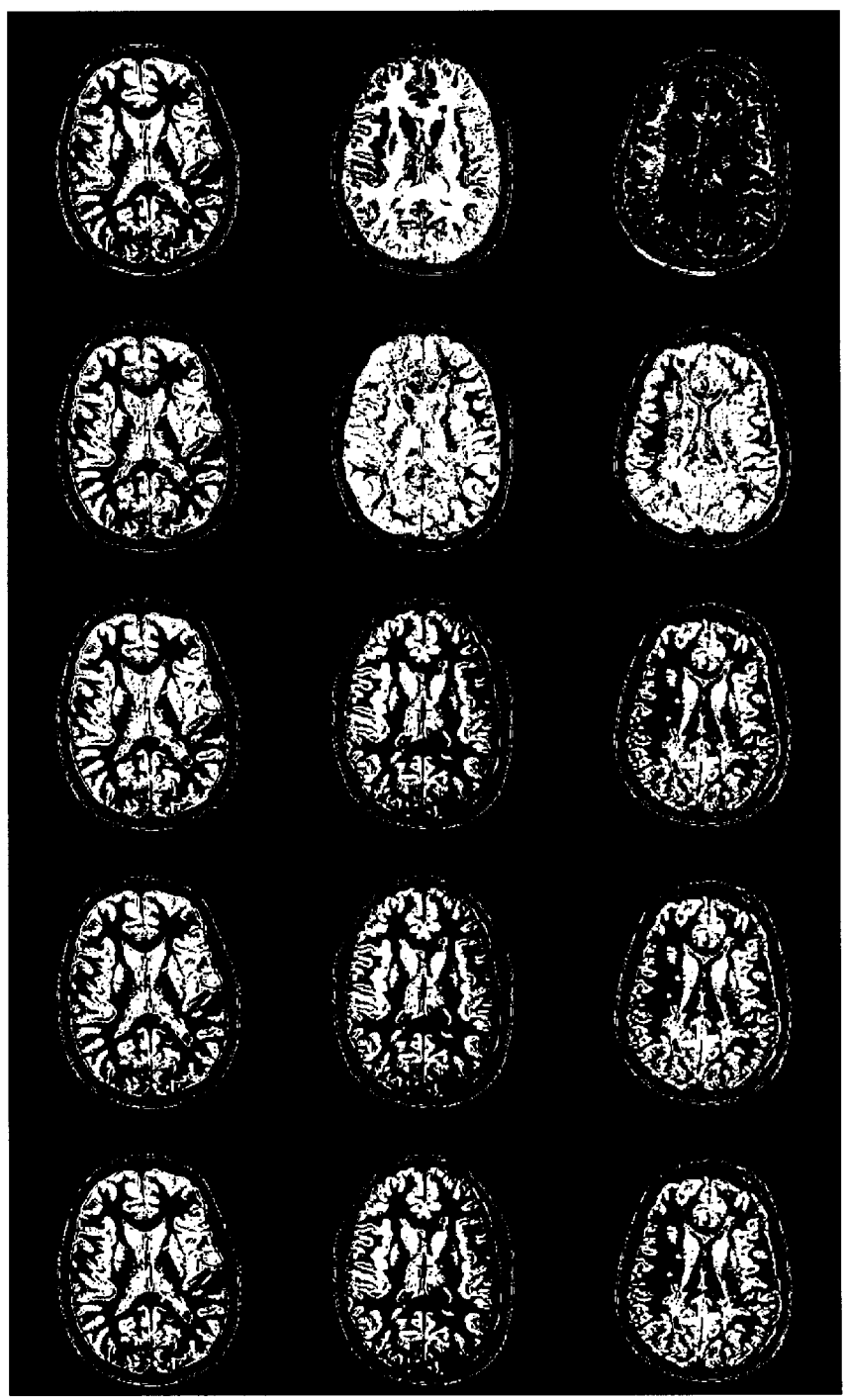
FIG. 14 depicts the images of FIG. 8 as binary, using a fixed threshold interval for each row. The threshold interval for the first image in each row was determined interactively to give a good GM definition by visual inspection. Rows 1–5 correspond to methods 0–4.

FIG. 14 demonstrates in another way, that the intensity values have no consistent meaning in the original images, but that consistency is present after the transformation. Images are displayed as binary using fixed thresholds to segment approximately the GM region of the brain. These images correspond exactly to those in FIG. 8.

For each row, the threshold intervals were chosen to roughly segment the GM region in the first study by visual inspection. In row 1, it is well demonstrated that the same thresholds did not segment the same tissue in different studies. In the second study, the given interval corresponded to mainly WM. In the third study, it is far below the brain tissue intensities.

The "switching" problem of the mode method is well illustrated by the images in the second row. Although the transformed images displayed at a "standard window," have similar brightness and contrast characteristics (see FIG. 8, second row), the fixed thresholds for small tissue intensity ranges are not quite applicable. The histograms of the three images in this example are like those shown in FIGS. 5(d), (b), and (e). The fixed interval thresholds segment GM in all three studies for methods 2–4 more consistently than in rows 1 and 2. This demonstrates that the meaning of intensities on the standard scale is significantly more consistent after median-based and other percentile-based transformations than by methods in the prior art.

Example 7

Cross and Mixed Training

Figure 15:
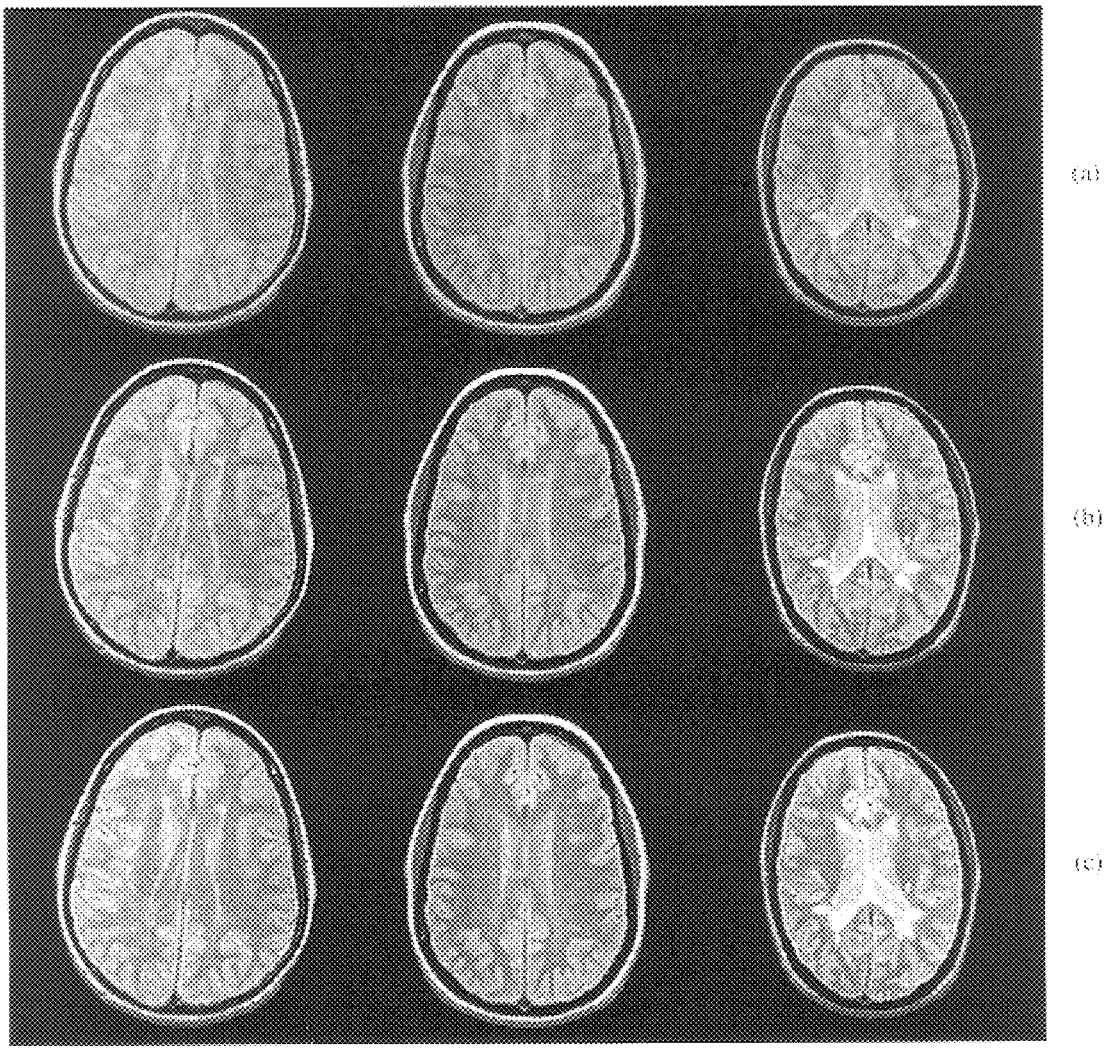
FIG. 15 depicts original slices from three (3) studies, all acquired using a fixed SE Pd protocol, before standardization.

The example illustrated in FIG. 15 shows that the method of the present invention was robust against small variations in protocol settings. The first row (FIG. 15(a)) depicts three SE Pd studies before standardization (displayed with the default window setting). The second row (FIG. 15(b)) shows the same slices after standardization using method 2 with the parameters that were derived from a training set of an identical SE Pd protocol. These images are displayed with the "standard" window setting for SE Pd, as listed in Table 2. The third row (FIG. 15(c)) shows the same slices after standardization with the parameters that were derived from a training set of images acquired using a FSE Pd protocol. These images were displayed with the "standard" window setting for FSE Pd, as listed in Table 2.

The main difference between the two mappings was a shift of the second mode. This discrepancy was silently corrected for display when the proper window setting was applied. After both transformations, and by using the corresponding window settings, the images look similar and have good brightness and contrast.

The training based on a set of images of a given protocol P and body region D caused the standardizer to be tuned tightly to the images in $V_{PD}$. This is due to the fact that the variation among histograms of images in $V_{PD}$ is less than that of images taken from $V_{PD}$ and $V_{P'D'}$, where $P \neq P'$ and/or $D \neq D'$.

Figure 16:
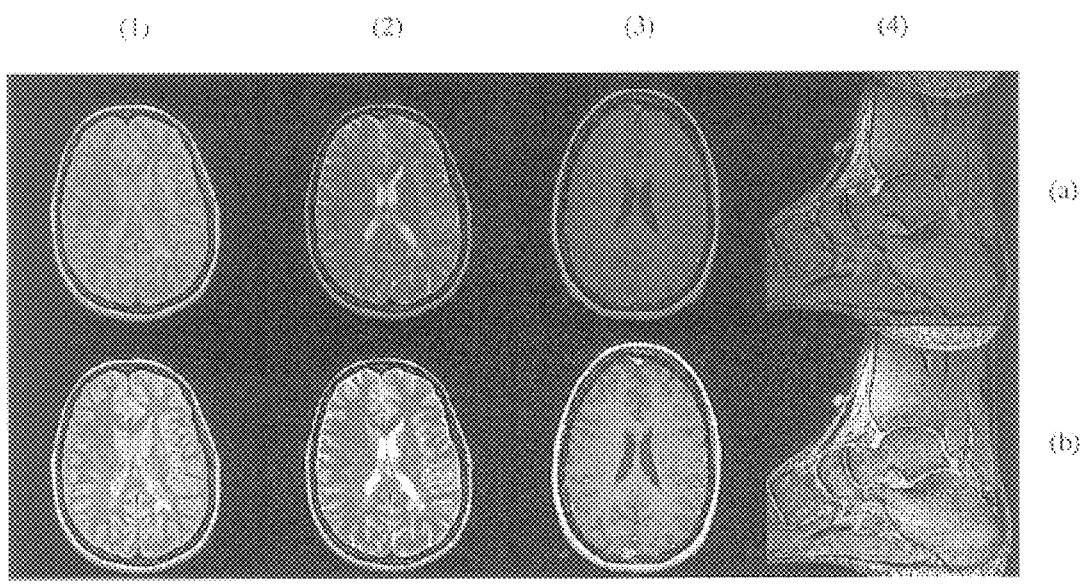
FIG. 16 illustrates the effect of mixed training. Ten (10) brain studies from each of FSE Pd (first column), FSE T2 (second column), and T1E (third column), and 10 T1-weighted gradient-echo studies of the foot (fourth column) were used in training.

Nevertheless, images of different protocols and body regions can be mixed for training and still create a standardizer that fosters consistency of tissue meaning. This is illustrated in FIG. 16, wherein images from four different combinations of protocol and body region were utilized in the training step and in devising the standardizer (in this case, using method 4). The figure quite elegantly demonstrates that the standardized images show a better consistency of brightness and contrast at fixed window displays (bottom row, FIG. 16(b)), as compared with the original images displayed at a default window for each image (top row, FIG. 16(a)).

Interpreting the images in FIGS. 15 and 16 also suggests an alternative simplification of the method of the present invention. Instead of devising the standardization transform by protocol and body region, in accordance with the simplified method it would be devised, based only on the type of the histogram, as shown e.g., FIG. 2. In other words, by the simplified method, the protocol and body-region-specific training and transformation could be obviated, thereby achieving consistency of intensity meaning, independent of the protocol and body region. For example, if the shoulder of the single mode in FIG. 2(a) is matched with the second mode (FIG. 2(b)) for images with different types of histograms, standardization schemes can be derived that are independent of histogram type. This leads eventually to an MR intensity scale that is similar to the CT scale for the purpose of interpreting tissues-specific intensities, and suggests that it may ultimately be possible to devise a whole body standardizer.

Example 8

Quantitative Comparisons

Two types of quantitative tests on data sets of brain obtained from three protocols FSE Pd, FSE T2, T1E were conducted to demonstrate the effect of intra- and inter-patient variations.

Intra-Patient Variations

Two scans, acquired at different time instances, were randomly selected for 15 patients from a database of MS patient studies, using the same training data sets and parameter configurations as were applied in the qualitative comparisons described previously. The test method for all three protocols was the same. The time distance between the two scans of the same patient varied between 1 and 6 years. For each patient the first scan was registered to the second via rigid body transformation based on intensity value correlation.

Because the patients had MS, the lesions were segmented in accordance with Udupa et al., *IEEE Trans. Med. Imaging*, 1997, and removed. Thus, for the purpose of comparison, the variations that may have been caused by disease were minimized in the two images of the same patient.

The similarity of each pair of registered, lesion-removed images was measured by the mean squared intensity difference, normalized to the original range of the images, and denoted NMSD. This similarity measure was computed for every pair of images for each method. Table 3 shows that the mean value and the standard deviation of the NMSD after each transformation were significantly smaller than that before transformation. The mean values of NMSD for the pairs of studies were compared using the paired t-test.

TABLE 3

Mean and standard deviation of normalized mean squared differences (NMSD) before (method 0) and after different standardizing transforms (methods 1–4) for 15 pairs of studies and for three different protocols. Each pair represents the studies obtained for the same patient at two time instances.

|        | FSE Pd |        | FSE T2 |        | T1E    |        |
|--------|--------|--------|--------|--------|--------|--------|
| Method | Mean   | SD     | Mean   | SD     | Mean   | SD     |
| 0      | 0.0099 | 0.0094 | 0.0093 | 0.0085 | 0.0020 | 0.0018 |
| 1      | 0.0039 | 0.0055 | 0.0036 | 0.0050 | 0.0020 | 0.0018 |
| 2      | 0.0039 | 0.0057 | 0.0035 | 0.0050 | 0.0020 | 0.0018 |
| 3      | 0.0040 | 0.0057 | 0.0033 | 0.0045 | 0.0020 | 0.0018 |
| 4      | 0.0039 | 0.0054 | 0.0028 | 0.0036 | 0.0019 | 0.0016 |

Tables 4 shows a pair-wise statistical comparison of the performance of the 5 methods in reducing the variability in the NMSD. The first block contains the significance values for comparing method 0 with methods 1–4 (i.e., the images before standardization and after standardizing with methods 1–4), demonstrating the effect of the standardizer. However, the differences in the improvements among the mode-based and other percentile-based variants were not statistically significant. Consequently, the second block shows the significance of the difference in variability reduction between each pair of standardizing methods.

TABLE 4 p-value of paired t-tests applied to the NMSD data.

| Method | Method | FSE Pd | FSE T2 | T1E    |
|--------|--------|--------|--------|--------|
| 0      | 1      | 0.0094 | 0.0036 | 0.0450 |
| 0      | 2      | 0.0101 | 0.0036 | 0.0374 |
| 0      | 3      | 0.0108 | 0.0031 | 0.0373 |
| 0      | 4      | 0.0102 | 0.0027 | 0.0241 |
| 1      | 2      | 0.1722 | 0.0040 | 0.5772 |
| 1      | 3      | 0.0154 | 0.0396 | 0.8138 |
| 1      | 4      | 0.7285 | 0.0795 | 0.1862 |
| 2      | 3      | 0.3415 | 0.0744 | 0.5628 |
| 2      | 4      | 0.6217 | 0.1007 | 0.2068 |
| 3      | 4      | 0.3450 | 0.1202 | 0.1925 |

Intensities in those parts of the image that have experienced no changes due to changes in the patient over time, were made considerably more repeatable after standardization than before. Further, the lower standard deviation of NMSD achieved after standardization demonstrates that the uniformity of intensity meaning resulting from standardization is less dependent on or affected by variabilities in the patient than by methods in the prior art.

Inter-patient Variation

For this comparison, 12 FSE Pd and 12 FSE T2 data sets were randomly selected from a database of patient studies. All images were previously segmented into WM, GM, and CSF regions in accordance with Udupa et al., *IEEE Trans. Med. Imaging*, 1997. The lesions were also segmented in accordance with Udupa et al., supra, and excluded from comparisons of the tissue regions. (T1E was not included in this evaluation because of the considerable difficulty of segmentation of WM, GM, and CSF by this protocol.)

Intensity statistics were separately calculated over the population of images for each tissue region. The standardizing parameters were the same as those for the preceding comparisons. For each region in each image $V_i$ in each protocol, the normalized mean intensity (NMI) was calculated by dividing the mean intensity in the region by $p_{2i}-p_{1i}$. This was repeated for each set of the transformed images, wherein normalization was derived by dividing the mean intensity in the region by $s_2-s_1$. The standard deviations of the mean values of the NMI values, before and after different standardizing transforms, are shown in Table 5, together with the corresponding 95% confidence intervals (assuming a normal distribution for all NMI values) and the coefficients of variation.

TABLE 5

Standard deviation (SD), 95% confidence interval (CI), and % coefficient of variation (CV) of the normalized mean intensity (NMI) values of different tissues in FSE Pd and T2 images.

|        |        | FSE Pd |        |         |       | FSE T2 |        |         |       |
|--------|--------|--------|--------|---------|-------|--------|--------|---------|-------|
| Tissue | Method | SD     | CI low | CI high | % CV  | SD     | CI low | CI high | % CV  |
| WM     | 0      | 0.1047 | 0.6572 | 0.7757  | 14.61 | 0.0580 | 0.3580 | 0.4236  | 14.83 |
| WM     | 1      | 0.0113 | 0.5523 | 0.5651  | 2.03  | 0.0091 | 0.3456 | 0.3559  | 2.59  |
| WM     | 2      | 0.0074 | 0.5728 | 0.5812  | 1.29  | 0.0090 | 0.3455 | 0.3557  | 2.56  |
| WM     | 3      | 0.0111 | 0.5693 | 0.5819  | 1.93  | 0.0086 | 0.3407 | 0.3504  | 2.49  |
| WM     | 4      | 0.0106 | 0.5695 | 0.5816  | 1.85  | 0.0099 | 0.3377 | 0.3489  | 2.88  |
| GM     | 0      | 0.1144 | 0.7189 | 0.8483  | 14.59 | 0.0643 | 0.4121 | 0.4852  | 14.33 |
| GM     | 1      | 0.0067 | 0.6230 | 0.6306  | 1.07  | 0.0119 | 0.4502 | 0.4636  | 2.60  |
| GM     | 2      | 0.0065 | 0.6397 | 0.6470  | 1.00  | 0.0097 | 0.4440 | 0.4519  | 1.85  |
| GM     | 3      | 0.0040 | 0.6449 | 0.6501  | 0.70  | 0.0137 | 0.4299 | 0.4453  | 3.13  |
| GM     | 4      | 0.0052 | 0.6458 | 0.6518  | 0.81  | 0.0137 | 0.4268 | 0.4423  | 3.15  |
| CSF    | 0      | 0.0884 | 0.5323 | 0.6323  | 15.18 | 0.0791 | 0.4564 | 0.5458  | 15.78 |
| CSF    | 1      | 0.0172 | 0.5309 | 0.5504  | 3.18  | 0.0348 | 0.6596 | 0.6989  | 5.12  |
| CSF    | 2      | 0.0185 | 0.5470 | 0.5679  | 3.33  | 0.0318 | 0.6572 | 0.6932  | 5.15  |
| CSF    | 3      | 0.0172 | 0.5181 | 0.5675  | 3.08  | 0.0296 | 0.6422 | 0.6757  | 4.49  |
| CSF    | 4      | 0.0185 | 0.5450 | 0.5660  | 3.33  | 0.0259 | 0.6141 | 0.6435  | 4.12  |

The results indicate that for every tissue region in both protocols tested, the standard deviation of NMI values is reduced by a factor of 2 to 10-fold as a result of standardization, and % CV is also reduced considerably. This demonstrates that a substantially improved uniformity of tissue meaning for intensities is obtained across patient studies as a result of the standardization methods of the present invention.

In sum, the examples confirm that image analysis and tissue segmentation methods are considerably improved by the methods of the present invention, in terms of both (i) constancy of parameter settings, and (ii) degree of automation upon scale standardization. With standardization, numerical meaning is achieved, and hence numerical diagnosis and the improved study of diseases are now possible, particularly if methods of the present invention are used as the first step in every MR image visualization and analysis task.

While the foregoing specification has been described with regard to certain preferred embodiments, and many details have been set forth for the purpose of illustration, it will be apparent to those skilled in the art, that without departing from the spirit and scope of the invention, the invention may be subject to various modifications and additional embodiments, and that certain of the details described herein can be varied considerably without departing from the basic principles of the invention. Such modifications and additional embodiments are also intended to fall within the scope and spirit of the invention appended claims.

What is claimed is:

1. A method for standardizing MR image intensity scales for imaging a region of the body of a patient, wherein the method comprises post-processing intensity transforming an MR image acquired by an MRI protocol, wherein a standardized intensity histogram is achieved for the MRI protocol, and for the region of the patient's body, comprising:
   a) estimating for the MRI protocol and region of the patient's body, certain landmarks from a given set of image histograms to form a standard scale histogram (a standardizer),
   b) imaging the region of the patient's body by the MRI protocol to form an image histogram, and
   c) computing the standardized intensity histogram by mapping landmarks determined from the image histogram to corresponding landmarks of the standard scale histogram.

2. The method of claim 1, wherein standardization images of similar intensities have similar tissue meaning, independent of variations within or between MRI scanners.

3. The method of claim 1, wherein standardized images of similar intensities have similar tissue meaning, independent of variations within or between MRI scanners.

4. The method of claim 1, wherein standardization is specific to the MRI protocol.

5. The method of claim 1, wherein standardization is specific to the body region.

6. The method of claim 1, wherein standardization is specific to the specific MRI protocol and the specific body region.

7. The method according to claim 1, wherein the method is automated.

8. The method according to claim 1, wherein a standardizer $\tau_{V_i}$ is stored in a lookup table.

9. The method according to claim 1, wherein a standardized image $V_{si}$ is stored as an output image.

10. The method according to claim 1, wherein standardization of the image permits using predetermined display window settings and facilitates image segmentation.

11. The method according to claim 8, wherein the images are accompanied by the standardizer lookup table when downloaded to a viewing station.

12. The method according to claim 8, wherein the images are automatically standardized.

13. The method according to claim 12, wherein standardization is built into an MR scanner, permitting production of real time images with the standard scale.

14. The standardized MR image intensity scales for imaging a region of the body of a patient according to claim 1.

15. The standardized MR image of a region of the body of a patient obtained by the method according to claim 1.

16. The standardized MR image of a region of the body of a patient obtained by the automated method according to claim 12.

17. The standardized MR image of a region of the body of a patient obtained by the method according to claim 13.

* * * * *